United States Patent
Boggs et al.

(10) Patent No.: US 7,051,329 B1
(45) Date of Patent: May 23, 2006

(54) METHOD AND APPARATUS FOR MANAGING RESOURCES IN A MULTITHREADED PROCESSOR

(75) Inventors: Darrell D. Boggs, Aloha, OR (US); Shlomit Weiss, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,575

(22) Filed: Dec. 28, 1999

Related U.S. Application Data

(63) Continuation-in-part of application No. 09/458,544, filed on Dec. 29, 1999, now Pat. No. 6,496,925.

(51) Int. Cl.
G06F 9/46 (2006.01)

(52) U.S. Cl. ........................ 718/104; 714/100; 714/102; 714/107

(58) Field of Classification Search ................. 709/107, 709/100, 104; 712/239, 235, 217, 227, 244, 712/219, 42, 214, 36; 718/102, 100, 104; 711/202
See application file for complete search history.

(56) References Cited

U.S. PATENT DOCUMENTS

| | | | |
|---|---|---|---|
| 3,771,138 A | | 11/1973 | Celtruda et al. |
| 5,179,530 A | * | 1/1993 | Genusov et al. ............ 708/520 |
| 5,357,617 A | | 10/1994 | Davis et al. |
| 5,404,469 A | | 4/1995 | Chung et al. |
| 5,430,850 A | | 7/1995 | Papadopoulos et al. |
| 5,499,349 A | | 3/1996 | Nikhil et al. |
| 5,524,263 A | | 6/1996 | Griffith et al. |

(Continued)

FOREIGN PATENT DOCUMENTS

| | | |
|---|---|---|
| EP | 0346003 A2 | 6/1989 |
| EP | 352935 A2 | 7/1989 |
| EP | 0725335 A1 | 1/1996 |
| EP | 0747816 A2 | 5/1996 |
| EP | 0768608 A2 | 4/1997 |
| EP | 0768608 A3 | 4/1997 |
| EP | 0827071 A2 | 8/1997 |
| EP | 0856797 A1 | 5/1998 |
| EP | 962856 A2 | 5/1999 |
| GB | 2311880 A | 3/1996 |
| WO | WO99/21082 | 4/1999 |
| WO | WO99/21088 | 4/1999 |

OTHER PUBLICATIONS

Mendelson A. et al., "Design Alternatives of Multithreaded Architecture", International Journal of Parallel Programming, US, Plenum Press, New York, Jun. 3, 1999, pp. 161–193, vol. 27, No. 3, Plenum Publishing Corp.

Farrens, M.K., et al., "Strategies for Achieving Improved Processor Throughput", Proceedings of the Annual International Symposium on Computer Architecture, May 1991, pp 362–369, vol. SYMP. 18.

R. Guru Prasadh, et al., A Benchmark Evaluation of a Multi-Threaded RISC Processor Architecture, 1991, pp 184–191, National Science Foundation and Cray Research Incorporated.

(Continued)

*Primary Examiner*—Meng-Al T. An
*Assistant Examiner*—Lilian Vo
(74) *Attorney, Agent, or Firm*—Blakely, Sokoloff, Taylor & Zafman LLP

(57) ABSTRACT

The present invention provides a method and apparatus for managing resources in a multithreaded processor. In one embodiment, a resource is partitioned into a number of portions based upon a number of threads being executed concurrently. Resource allocation for each thread is performed in its respective portion of the resource.

15 Claims, 17 Drawing Sheets

U.S. PATENT DOCUMENTS

| | | | |
|---|---|---|---|
| 5,791,522 | A | 8/1998 | Lee et al. |
| 5,809,271 | A | 9/1998 | Colwell et al. |
| 5,809,522 | A | 9/1998 | Novak et al. |
| 5,892,959 | A | 4/1999 | Fung |
| 5,900,025 | A | 5/1999 | Sollars |
| 5,968,160 | A | 10/1999 | Saito et al. |
| 5,996,085 | A | 11/1999 | Cheong et al. |
| 5,999,932 | A | 12/1999 | Paul |
| 6,052,708 | A | 4/2000 | Flynn et al. |
| 6,052,709 | A | 4/2000 | Paul |
| 6,088,788 | A | 7/2000 | Borkenhagen et al. |
| 6,092,175 | A | 7/2000 | Levy et al. |
| 6,105,127 | A | 8/2000 | Kimura et al. |
| 6,115,709 | A | 9/2000 | Gilmour et al. |
| 6,182,210 | B1 * | 1/2001 | Akkary et al. ............... 712/235 |
| 6,212,544 | B1 | 4/2001 | Borkenhagen et al. |
| 6,233,599 | B1 | 5/2001 | Nation et al. |
| 6,247,121 | B1 * | 6/2001 | Akkary et al. ............... 712/239 |
| 6,256,775 | B1 | 7/2001 | Flynn |
| 6,357,016 | B1 * | 3/2002 | Rodgers et al. ............. 713/601 |
| 6,496,925 | B1 * | 12/2002 | Rodgers et al. ............. 712/244 |
| 2001/0004755 | A1 * | 6/2001 | Levy et al. .................. 712/217 |
| 2002/0013892 | A1 * | 1/2002 | Gorishek et al. ............ 712/227 |
| 2002/0062435 | A1 * | 5/2002 | Nemirovsky et al. ........... 712/7 |
| 2002/0091914 | A1 * | 7/2002 | Merchant et al. ........... 712/219 |
| 2002/0116600 | A1 * | 8/2002 | Smith et al. ................. 712/218 |

OTHER PUBLICATIONS

Robert A. Iannucci, et al., Multithreaded Computer Architecture: A Summary of the State of the Art, pp 167–200, Kluwer Academic Publishers, Boston/London/Dordrecht.

Proceedings, The 23rd Annual International Symposium on Computer Architecture, May 22–24, 1996, pp 191–202, ACM SIGARCH, IEEE Computer Society, TCCA, Philadelphia, Pennsylvania.

Proceedings, The 23rd Annual International Symposium on Computer Architecture, May 22–24, 1996, pp 203–212, ACM SIGARCH, IEEE Computer Society, TCCA, Philadelphia, Pennsylvania.

Dennis Lee, et al. & Brad Calder, et al., Instruction Cache Fetch Policiess for Speculative Execution, pp 1–11, Departmant of Computer Science.

Simon W. Moore, Multithreaded Processor Design, 1996, pp 1–141, Kluwer Academic Publishers, Boston/Dordrecht/London.

Peter Song, Multithreading Comes of Age, Jul. 14, 1997, pp 13–18, Microdesign Resources.

Ruedeiger R. Asche, Multithreading for Rookies, Jul. 31, 1998, pp 1–15, Microsoft Developers Network Technology Group.

IEEE Computer Society Technical Committee on Computer Architecture, Second International Symposium on High–Performance Computer Architecture, Feb. 3–7, 1996, pp291–301.

Dongwook Kim, Joonwon Lee, Seungkyu Park, A partitioned on–chip virtual cache for fast processors, Journal of Systems Architecture 43, 1997, pp 519–531, Elsevier, South Korea.

* cited by examiner

METHOD AND APPARATUS FOR MANAGING RESOURCES IN A MULTITHREADED PROCESSOR

This application is a continuation-in-part of application Ser. No. 09/458,544, filed Dec. 9, 1999, now U.S. Pat. No. 6,496,925.

FIELD OF THE INVENTION

The present invention relates generally to the field of multithreaded processing. More specifically, the present invention relates to a method and apparatus for managing resources in a multithreaded processor.

BACKGROUND OF THE INVENTION

Various multithreaded processor designs have been considered in recent times to further improve the performance of processors, especially to provide for a more effective utilization of various processor resources. By executing multiple threads in parallel, the various processor resources are more fully utilized which in turn enhances the overall performance of the processor. For example, if some of the processor resources are idle due to a stall condition or other delay associated with the execution of a particular thread, these resources can be utilized to process another thread. A stall condition or other delay in the processing of a particular thread may happen due to a number of events that can occur in the processor pipeline including, for instance, a cache miss or a branch misprediction. Consequently, without multithreading capabilities, various available resources within the processor would have been idle due to a long-latency operation, for example, a memory access operation to retrieve the necessary data from main memory, that is needed to resolve the cache miss condition.

Furthermore, multithreaded programs and applications have become more common due to the support provided for multithreading programming by a number of popular operating systems such as the Windows NT® and UNIX operating systems. Multithreaded applications are particularly attractive in the area of multimedia processing.

Multithreaded processors may generally be classified as fine or coarse grained designs, based upon the particular thread interleaving or switching scheme employed within the respective processor. In general, fine grained multithreaded designs support multiple active threads within a processor and typically interleave two different threads on a cycle-by-cycle basis. Coarse grained multithreaded designs, on the other hand, typically interleave the instructions of different threads on the occurrence of some long-latency event, such as a cache miss. A coarse multithreaded design is discussed in Eickmayer, R., Johnson, R. et al. "Evaluation of Multithreaded Uniprocessors for Commercial Application Environments", *The 23rd Annual International Symposium on Computer Architecture*, pp. 203–212, May 1996. The distinctions between fine and coarse designs are further discussed in Laudon, J., Gupta, A. "Architectural and Implementation Tradeoffs in the Design of Multiple-Context Processors", *Multithreaded Computer Architectures: A Summary of the State of the Art*, edited by R. A. Iannuci et al., pp. 167–200, Kluwer Academic Publishers, Norwell, Mass., 1994.

While multithreaded designs based on interleaved schemes are generally advantageous over single threaded designs, they still have their own limitations and shortcomings. In the fine grained multithreaded designs which interleaves two different threads on a cycle-by-cycle basis, there are limitations on the applications due to the fact that each thread cannot make progress in every cycle. A thread is limited to a single instruction in the pipeline to eliminate the possibility of pipeline dependencies. To tolerate memory latency, a thread is prevented from issuing its next instruction until the memory operation is completed. However, limiting a thread to a single instruction in the pipeline causes some constraints. First, a large number of threads would be needed to fully utilize the processor. Second, the performance of a single thread is poor because a thread could at best issue a new instruction every cycle. While coarse grained multithreaded designs have some advantages over the fine multithreaded designs, they also have their shortcomings. First, the cost of thread switching is high because the decision to switch is made late in the pipeline which can cause partially executed instructions in the pipeline from the switching thread to be squashed. Second, because of the high cost of thread switching, multiple threads cannot be used to tolerate short latencies.

SUMMARY OF THE INVENTION

The present invention provides a method and apparatus for managing resources in a multithreaded processor. In one embodiment, a resource is partitioned into a number of portions based upon a number of threads being executed concurrently. Resource allocation for each thread is performed in its respective portion of the resource. The partitioning is dynamic and changes as the number of active threads changes. If only one thread is active, then all of the resource is devoted to that thread. If all threads are active, then the resource is fully partitioned.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be practiced without these specific details.

In the discussion below, the teachings of the present invention are utilized to implement a method and an apparatus for managing various processor resources used for the execution of multiple threads in a multithreaded processor. The various resources are partitioned according to a partitioning scheme based upon the number of threads that are executed concurrently. The partitioning is dynamic and changes as the number of active threads changes. If only one thread is active, then all of the resources are devoted to that thread. If all threads are active, then the resources are fully partitioned. For illustrative and explanation purposes only, the present invention is described with respect to a switching scheme between a single threading environment and a multithreading environment in which two threads are executed concurrently. However, the teachings of the present invention should not be limited to two threads and should be applicable to any multithreading environment in which more than two threads are executed concurrently. The teachings of the present invention are equally applicable to any switching scheme between an M-threaded environment to an N-threaded environment where M can be greater or less than N (e.g., switching from a 4-threaded environment to a 2-threaded environment, switching from a 2-threaded environment to a 5-threaded environment, etc.). In one embodiment, when two threads are executed in a multithreading mode, each resource is partitioned into two portions. One of the two portions is reserved for the execution of one thread and the other portion is reserved for the execution of the other thread. If there are insufficient resources to accommodate the execution of instructions within one particular thread, then a stall signal is generated to stall further feeding of instructions from that particular thread down the processor pipeline until enough resources become available. The teachings of the present invention are applicable to any multithreaded processor that is designed to process multiple threads (e.g., two or more threads) concurrently. However, the teachings of the present invention are not limited to multithreaded processors and can be applied to any processor and/or machine in which resources are shared between tasks or processes.

Figure 1:
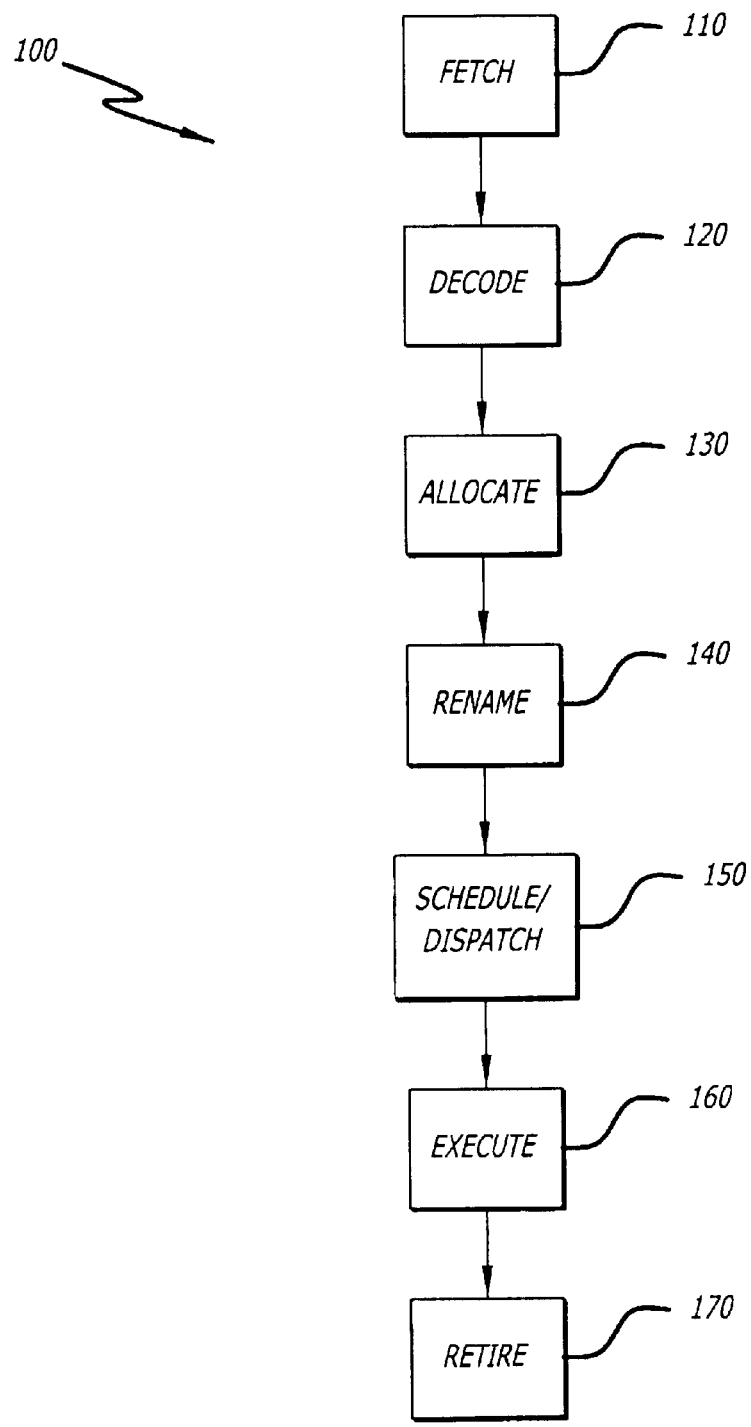
FIG. 1 is a block diagram of one embodiment of a processor pipeline.

FIG. 1 is a block diagram of one embodiment of a processor pipeline within which the present invention may be implemented. For the purposes of the present specification, the term "processor" refers to any machine that is capable of executing a sequence of instructions and shall be taken to include, but not be limited to, general purpose microprocessors, special purpose microprocessors, graphics controllers, audio processors, video processors, multi-media controllers and microcontrollers. The processor pipeline 100 includes various processing stages beginning with a fetch stage 110. At this stage, instructions are retrieved and fed into the pipeline 100. For example, a macroinstruction may be retrieved from a cache memory that is integral within the processor or closely associated therewith, or may be retrieved from an external memory unit via a system bus. The instructions retrieved at the fetch stage 110 are then delivered to a decode stage 120 where the instructions or macroinstructions are decoded into microinstructions or micro-operations for execution by the processor. At an allocate stage 130, processor resources necessary for the execution of the microinstructions are allocated. The next stage in the pipeline is a rename stage 140 where references to external or logical registers are converted into internal or physical register references to eliminate dependencies caused by register reuse. At a schedule/dispatch stage 150, each microinstruction is scheduled and dispatched to an execution unit. The microinstructions are then executed at an execute stage 160. After execution, the microinstructions are then retired at a retire stage 170.

In one embodiment, the various stages described above can be organized into three phases. The first phase can be referred to as an in-order front end including the fetch stage 110, decode stage 120, allocate stage 130, and rename stage 140. During the in-order front end phase, the instructions proceed through the pipeline 100 in their original program order. The second phase can be referred to as the out-of-order execution phase including the schedule/dispatch stage 150 and the execute stage 160. During this phase, each instruction may be scheduled, dispatched and executed as soon as its data dependencies are resolved and the execution unit is available, regardless of its sequential position in the original program. The third phase, referred to as the in-order retirement phase which includes the retire stage 170 in which instructions are retired in their original, sequential program order to preserve the integrity and semantics of the program, and to provide a precise interrupt model.

Figure 2:
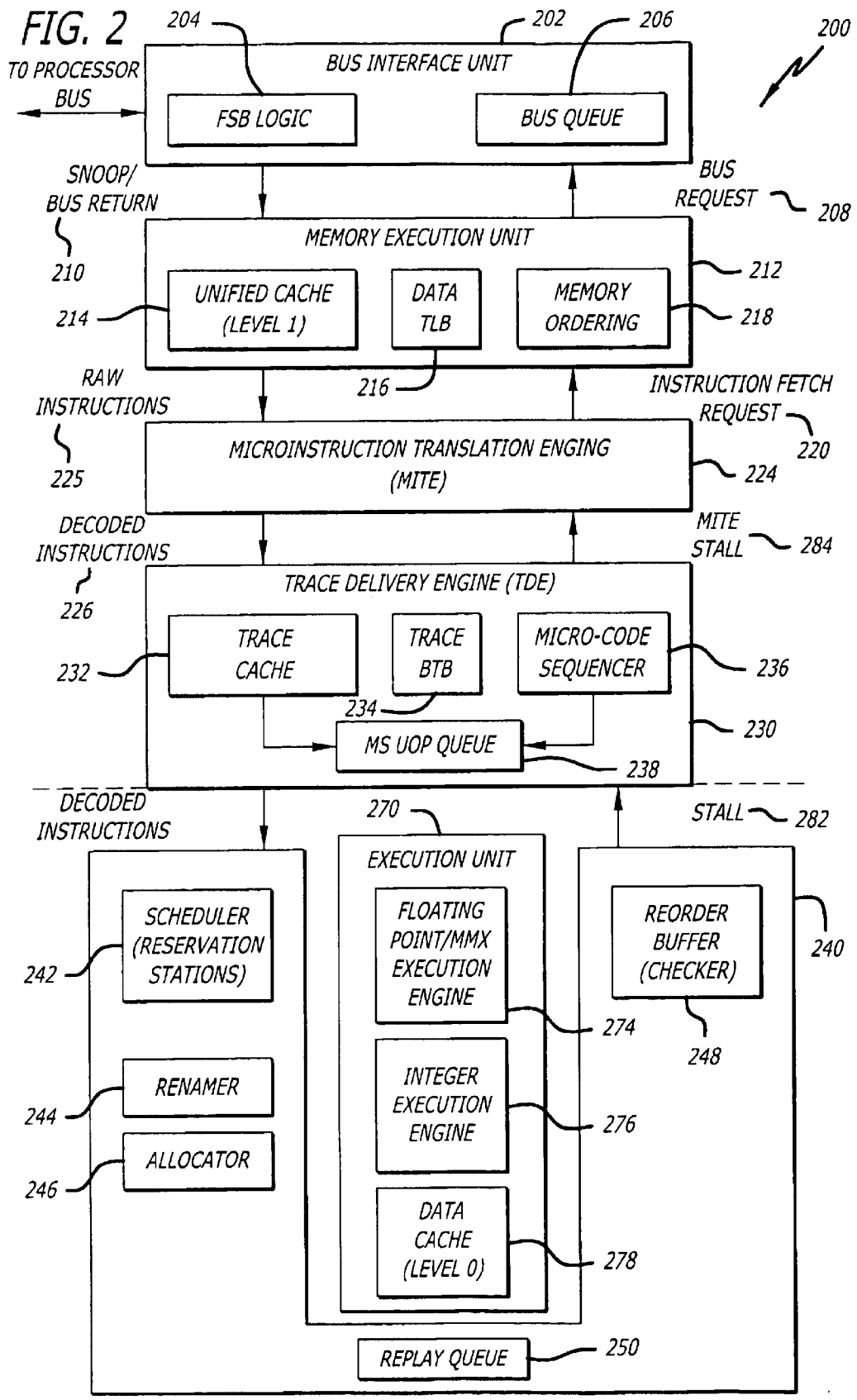
FIG. 2 shows a block diagram of one embodiment of a processor architecture in which the teachings of present invention are implemented.

FIG. 2 is a block diagram of one embodiment of a processor, in the form of a general-purpose microprocessor 200, in which the present invention may be implemented. The microprocessor 200 described below is a multithreaded (MT) processor and capable of processing multiple instruction threads simultaneously. However, the teachings of the present invention described below are fully applicable to other processors that process multiple instruction threads in an interleaved manner and also to single thread processors which have the capabilities to process multiple instructions either in parallel or in an interleaved manner. In one embodiment, the microprocessor 200 may be an Intel Architecture (IA) microprocessor that is capable of executing an Intel Architecture instruction set.

The microprocessor 200 comprises an in-order front end, an out-of-order execution core and an in-order retirement back end. The microprocessor 200 includes a bus interface unit 202 which functions as an interface between the microprocessor 200 and other components (e.g., main memory unit) of a computer system within which the microprocessor 200 may be implemented. The bus interface unit 202 couples the microprocessor 200 to a processor bus (not shown) via which data and control information are transferred between the microprocessor 200 and other system components (not shown). The bus interface unit 202 includes Front Side Bus (FSB) logic 204 that controls and facilitates communications over the processor bus. The bus interface unit 202 also includes a bus queue 206 that is used to provide a buffering function with respect to the communications over the processor bus. The bus interface unit 202 receives bus requests 208 from a memory execution unit 212. The bus interface unit 202 also sends snoops or bus returns to the memory execution unit 212.

The memory execution unit 212 is structured and configured to function as a local memory within the microprocessor 200. The memory execution unit 212 includes a unified data and instruction cache 214, a data Translation Lookaside Buffer (TLB) 216, and a memory ordering logic 218. The memory execution unit 212 receives instruction fetch requests 220 from a microinstruction translation engine (MITE) 224 and provides raw instructions 225 to the MITE 224. The MITE 224 decodes the raw instructions 225 received from the memory execution unit 212 into a corresponding set of microinstructions, also referred to as micro-operations. Decoded microinstructions 226 are sent by the MITE 224 to a trace delivery engine (TDE) 230.

The TDE 230 functions as a microinstruction cache and is the primary source of microinstructions for a downstream execution unit 270. The TDE 230 includes a trace cache 232, a trace branch predictor (BTB) 234, a micro-code sequencer 236, and a micro-operation (uop) queue 238. By having a microinstruction caching function within the processor pipeline, the TDE 230 and specifically the trace cache 232 can leverage the work done by the MITE 224 to provide a relatively high microinstruction bandwidth. In one embodiment, the trace cache 232 may comprise a 256 entry, 8 way set associate memory. The term "trace", in one embodiment, refers to a sequence of microinstructions stored as entries in the trace cache 232 with each entry having pointers to preceding and proceeding microinstructions in the trace. Therefore, the trace cache 232 can facilitate high-performance sequencing in that the address of the next entry to be accessed to obtain a subsequent microinstruction is known before a current access is completed. The trace cache branch predictor 234 provides local branch predictions with respect to traces within the trace cache 232. The trace cache 232 and the microcode sequencer 236 provide microinstructions to the micro-op queue 238.

The microinstructions are then fed from the micro-op queue 238 to a cluster (also referred to as the Rename, Reservation Station, Replay, and Retirement or RRRR cluster) 240. The RRRR cluster 240, in one embodiment, is responsible for controlling the flow of the microinstructions received from the TDE 230 through the rest of the microprocessor 200. The functions performed by the RRRR cluster 240 include allocating the resources used for the execution of the microinstructions received from TDE 230; converting references to external or logical registers into internal or physical register references; scheduling and dispatching the microinstructions for execution to an execution unit 270; providing those microinstructions that need to be re-executed to the execution unit 270; and retiring those microinstructions that have completed execution and are ready for retirement. The structure and operation of the RRRR cluster 240 are described in more detail below. In the event that the resources are insufficient or unavailable to process a microinstruction or a set of microinstructions, the RRRR cluster 240 will assert a stall signal 282 that is propagated to the TDE 230. The stall signal 282 is then updated and sent by the TDE 230 to the MITE 224.

The microinstructions that are ready for execution are dispatched from the RRRR cluster 240 to the execution unit 270. In one embodiment, the execution unit 270 includes a floating point execution engine 274, an integer execution engine 276, and a level 0 data cache 278. In one embodiment in which the microprocessor 200 executes the IA32 instruction set.

Figure 3:
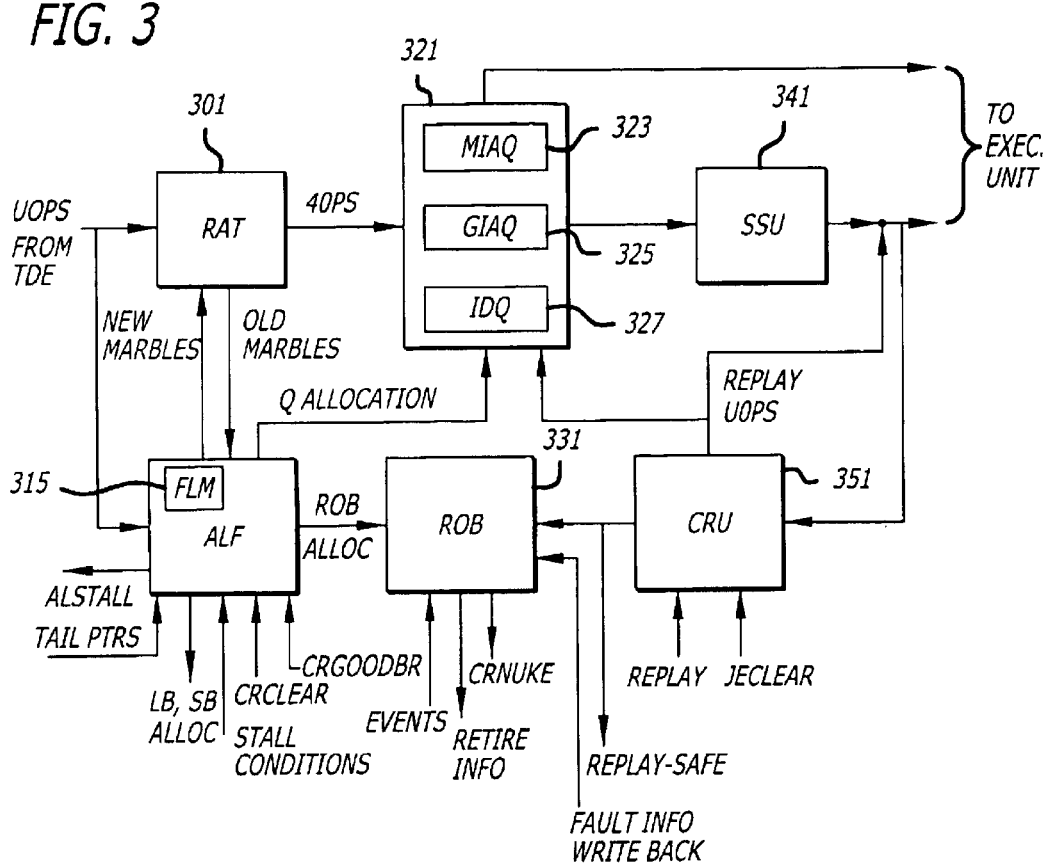
FIG. 3 shows a block diagram of one embodiment of a processor unit that implements the teachings of the present invention.

FIG. 3 shows a block diagram of one embodiment of the RRRR cluster 240 described in FIG. 2 above. The RRRR cluster 240 as shown in FIG. 3 includes a register allocation table (RAT) 301, an allocator and free-list manager (ALF) 311, an instruction queue (IQ) 321, a reorder buffer (ROB) 331, a scheduler and scoreboard unit (SSU) 341, and a checker and replay unit (CRU) 351.

In the present embodiment, the TDE 230 delivers the microinstructions (UOPs) to both the ALF 311 and the RAT 301. The ALF 311 is responsible for allocating most of the resources needed for the execution of the UOPs received from the TDE 230. The ALF 311 includes a free-list manager structure (FLM) 315 that is used to maintain a history of register allocation. The RAT (also referred to as register renamer) 301 renames the logical registers specified in each UOP to the appropriate physical register pointers to remove the dependencies caused by register reuse. Once the ALF 311 and the RAT 301 have completed their corresponding functions, the UOPs are sent to the IQ 321 for temporary holding prior to being dispatched for execution by the SSU 341. In the embodiment shown in FIG. 3, the IQ 321 is responsible for providing the information about each UOP to the SSU 341 so that the SSU 341 can dispatch the respective UOP to the proper execution unit based on data dependency. In one embodiment, the IQ 321 includes a memory instruction address queue (MIAQ) 323, a general instruction address queue (GIAQ) 325, and an instruction data queue (IDQ) 327. In one embodiment, the MIAQ 323 and the GIAQ 325 are used to hold and feed certain time-critical information to the SSU 341 as quickly as needed. The time-critical information include the UOP's sources and destinations, UOP latency, etc. Depending on the type of input UOP, the ALF 311 determines whether the MIAQ 323 or the GIAQ 325 will be used to hold the time-critical information for the respective input UOP. The MIAQ 323 is used for memory UOPs (i.e., UOPs that require memory access). The GIAQ 325 is used for non-memory UOPs (i.e., UOPs that do not require memory access). The IDQ 327 is used to hold the less time-critical information such as the opcode and immediate data.

When a UOP's sources are ready and an execution unit is available, the SSU 341 schedules and dispatches the UOP for execution. There are instances when some UOPs may produce incorrect data, for example due to a level 0 data cache miss. If a particular UOP produces incorrect data or uses incorrect data in its execution, the CRU 351 will be informed of the need for this particular UOP to be re-executed or replayed until the correct results are obtained. The checker of the CRU 351 examines each UOP after its execution to determine whether the respective UOP needs to be re-executed. If so, the replay manager of the CRU 351 is responsible for re-dispatching the respective UOP to the appropriate execution unit for re-execution. If the checker determines that a particular UOP does not need to be re-executed, that particular UOP will be sent to the ROB 331 for retirement.

The ROB 331 is responsible for retiring each UOP in its original logical program order once its execution has been completed and it is ready for retirement (i.e. no replay). In addition, the ROB 331 is responsible for handling internal and external events. Examples of internal events include exceptions signaled by the write back of various UOPs such as floating point denormal assist or other events signaled by UOPs that need to be handled by the microcode (e.g., assists). External events include interrupts, page fault, SMI requests, etc. In one embodiment, the ROB 331 is the unit responsible for ensuring that all events are serviced in accordance with the architectural requirements of the microprocessor. There are several conditions like events, interrupts, halt, reset, etc. that will cause the machine to change mode or to switch between MT and ST configuration. Whenever the ROB 331 detects such a condition, it asserts a signal or a set of signals (referred to as CRNuke herein) which causes all the UOPs being processed but not retired or committed to be flushed. The ROB 331 then provides the TDE 230 with the address of the microinstruction from which to start sequencing UOPs to handle the event. For example, if the memory cluster detects a page fault exception on a load UOP, it will transmit a signal to the ROB 331 to alert the ROB 331 of this event. When the ROB 331 reaches this load UOP, it will assert the signal CRNuke and not commit any state for any of the UOPs including the load UOP and those following it. The ROB 331 will then send the appropriate information to the TDE 230 to start sequencing UOPs to service the page fault exception.

In one embodiment, the ROB 331 is responsible for detecting and controlling transitions of the machine from single thread mode to multi-thread mode and back. It performs its corresponding function by detecting certain events which can be either internal or external and asserting CRNuke to the rest of the machine and also asserting signals to communicate the new state of the machine. The rest of the machine reacts to the CRNuke signal and the new state signals to enter or exit MT mode or ST mode.

In one embodiment, the resources that are allocated by the ALF 311 for the execution of the incoming UOPs include the following:

1. Sequence number given to each UOP to track the original logical program order of the respective UOP. In one embodiment, the sequence number given to each UOP within a particular thread is unique with respect to other UOPs within that particular thread. The sequence number is used for the in-order retirement of the UOPs once their executions are completed. The sequence number of each UOP is also used in the event that the input UOPs are to be executed in-order.

2. Entry in the Free List Manager (FLM) 315 given to each UOP to allow the rename history of the respective UOP to be tracked and recovered in case there is problem with the execution of a particular UOP and it needs to be re-executed.

3. Entry in the Reorder Buffer (ROB) 331 given to each UOP to allow the respective UOP to be retired in-order once its execution is completed successfully and the UOP is ready to be retired.

4. Entry in the physical register file given to each UOP to store the operand data needed for the execution of the respective UOP and the result produced therefrom.

5. Entry in the Load Buffer given to each UOP that needs to receive data from the MEU 212 (also referred to as the memory execution cluster).

6. Entry in the Store Buffer given to each UOP that is to produce some data to be stored in the memory execution cluster.

7. Entry in the IDQ 327 given to each UOP to hold the instruction information before the respective UOP is dispatched by the SSU 341 to the execution unit 270.

8. Entry in the MIAQ 323 given to each memory UOP or entry in the GIAQ 325 given to each non-memory UOP to hold the time-critical information for the respective UOP before it is dispatched by the SSU 341 to the execution unit 270.

In one embodiment, the ALF 311 is responsible for determining which resources are required for the execution of an input UOP received from the TDE 230 and how much of required resources need to be allocated for the respective UOP. For example, the ALF 311, upon receiving a UOP from the TDE 230, will determine whether a load buffer entry is needed and will allocate the appropriate load buffer entry for the respective UOP if there is an entry available in the load buffer. If no entry is available, the ALF 311 will generate a stall signal 282 as shown in FIG. 2 to inform the TDE 230 and other units within the processor that the incoming UOP cannot be allocated and certain units within the processor, for example the TDE 230, need to stall until the stall conditions are cleared. In one embodiment, the ALF 311 provides the appropriate allocation information (e.g. allocation pointers) to other units within the RRRR cluster 240 including the IQ 321, the RAT 301, the ROB 331 and other units outside of the RRRR cluster 240, for example the MEU 212 (FIG. 2).

In one embodiment, the ALF 311 uses certain information maintained by other units such as a set of pointers referred to as tail pointers to determine, with respect to a particular resource such as a load buffer, the amount of free entries available for allocation. The ALF 311 also receives other signals such as clear signals due to branch misprediction (e.g., JEClear and CRClear) that are used to determine whether to generate a stall signal.

In one embodiment, the microprocessor 200 can operate in either a single thread (ST) mode or a multithread (MT) mode based upon a control input signal. In one embodiment, the control input signal indicating whether the microprocessor 200 is to operate in ST or MT mode is provided by the operating system. As explained above, the ALF unit 311, in the present embodiment, is responsible for allocating most of the processor resources that are used for the execution of a particular UOP in a particular thread. The various resources allocated by the ALF unit 311 include the ROB 331, the FLM 315, the MIAQ 323, the GIAQ 325, the IDQ 327,.the load buffer (LB) (not shown), the store buffer (SB) (not shown), and the physical register file entries that are required by the input UOPs. Each of the resources mentioned above contains a predetermined number of resource elements or entries that are to be allocated based upon the need of the respective UOPs and the availability of those resource elements or entries. In one embodiment, for example, the ROB 331 contains 126 entries, the FLM 315 contains 126 entries, the IDQ 327 contains 126 entries, the GIAQ 325 contains 32 entries, the MIAQ 323 contains 32 entries, the load buffer contains 48 entries, the store buffer contains 24 entries, and the physical register file contains 127 entries.

In the discussion that follows, it is assumed that there are two threads, thread 0 (T0) and thread 1 (T1) that can be executed concurrently by the microprocessor 200 in MT mode or executed individually in ST mode. However, the teachings of the present invention should not be limited to two threads and everything discussed herein equally applies to a processing environment in which more than two threads are executed concurrently. In addition, the discussion below is focused on the resource computation and allocation performed by the ALF unit 311 with respect to one exemplary queue, referred to hereinafter as Q, that is configured to operate as a circular queue or buffer. However, the teachings of the present invention is equally applicable to any other processor resource or any other data structure including, but not limited to, a non-circular queue structure, a linked-list structure, an array structure, a tree structure, etc.

In ST mode or ST configuration, each processor resource used in the execution of the UOPs is allocated to the "working" thread, either thread 0 or thread 1. The working thread is the particular thread to which the current set of UOPs received from the TDE 230 belong with respect to the current processing period. In one embodiment, the TDE 230 supplies as many as three valid UOPs per a processing clock cycle. AU valid UOPs in each clock cycle are tagged with one thread bit indicating the particular thread to which the respective allocation clock belongs. The thread bit is used to identify which of the two threads is the current working thread. In addition, the TDE 230 is responsible for supplying the correct valid bits for the set of UOPs that the TDE 230 delivers to the RRRR cluster 240. Each UOP received from the TDE 230 therefore is tagged with a valid bit indicating whether the respective UOP is a valid UOP. When the TDE 230 has no valid UOPs to be allocated, the TDE 230 is responsible for driving the valid bits to invalid status. The UOPs within each thread are delivered by the TDE 230 to the RRRR cluster 240 in their original sequential program order.

In MT mode or MT configuration, each of the queues or buffers used for the execution of the UOPs is partitioned into two portions, one portion is to be used for thread 0 and the other portion is used for thread 1. In one embodiment, the two portions are sized equally so that each thread is given the same number of queue or buffer entries. In one embodiment, the physical registers are a common resource to be shared by thread 0 and thread 1 on a first come, first served basis and there is no partition of the physical registers between the two threads.

In one embodiment, the queues or buffers to be allocated are configured as circular queues or circular buffers. Accordingly, once the end of a queue or a buffer is reached, allocation for subsequent UOPs will wrap around and start at the beginning of the queue or buffer. The wrap around operation with respect to a circular queue or buffer is described in greater detail below in conjunction with the various operations performed by the ALF 311 in doing resource computation and resource allocation for each resource.

In one embodiment, the ALF 311 utilizes a separate set of pointers for each thread with respect to each resource in order to perform the resource computation and allocation for each thread. As such, there are two separate sets of pointers associated with each resource. Each set of pointers includes a head pointer, a tail pointer, and a stall pointer. The head pointer is used for the allocation of the queue entries. For example, if the head pointer for a particular queue points to entry 1 in that queue, then entry 1 is the entry to be allocated for the respective UOP. Once entry 1 is allocated, the head pointer is advanced to the next entry in the queue, entry 2. The tail pointer is used for the deallocation of queue entries. For example, if the tail pointer for a particular queue points to entry 1 in that queue, then entry 1 is the entry to be freed once the execution of the respective UOP is completed. Once entry 1 is deallocated or freed up, the tail pointer is advanced to the next entry to be deallocated, entry 2. The stall pointer is used to determine whether there are enough free queue entries to accommodate the next allocation. For example, if the stall pointer for a particular queue points to entry 3 and the incoming UOPs require three entries for their allocation, then the stall pointer will point to entry 6 if there is enough room in the queue to allocate three entries for the input UOPs. In one embodiment, the value of the stall pointer is compared with the value of the tail pointer to determine whether there is enough room for the required allocation.

In one embodiment, the allocation policy used for the ROB 331, FLM 315, and IDQ 327 is a block allocation of three. Accordingly, if there is any valid UOP in the set of three input UOPs then 3 entries in those queues will be used even if not all of the inputs UOPs are valid. The allocation policy with respect to the GIAQ 325, MIAQ 323, load buffer, and store buffer is based upon the actual requirements of the input UOPs. Accordingly, entries in those queues will be allocated only if the input UOPs require them.

Figure 4A:
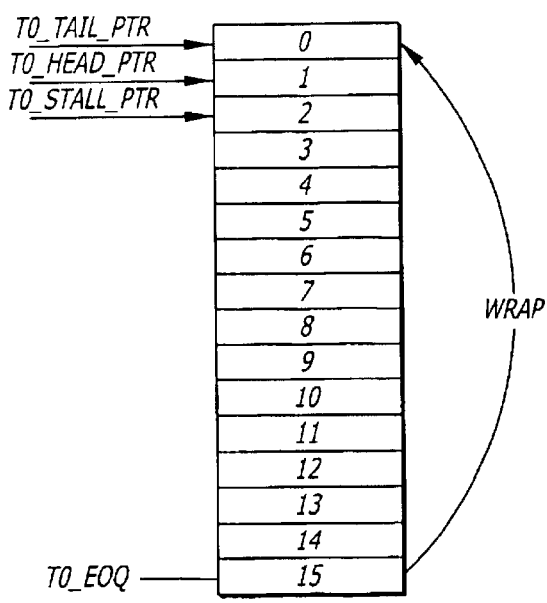
FIGS. 4*a* illustrates a structure of one embodiment of a circular queue in a single threading mode.
Figure 4B:
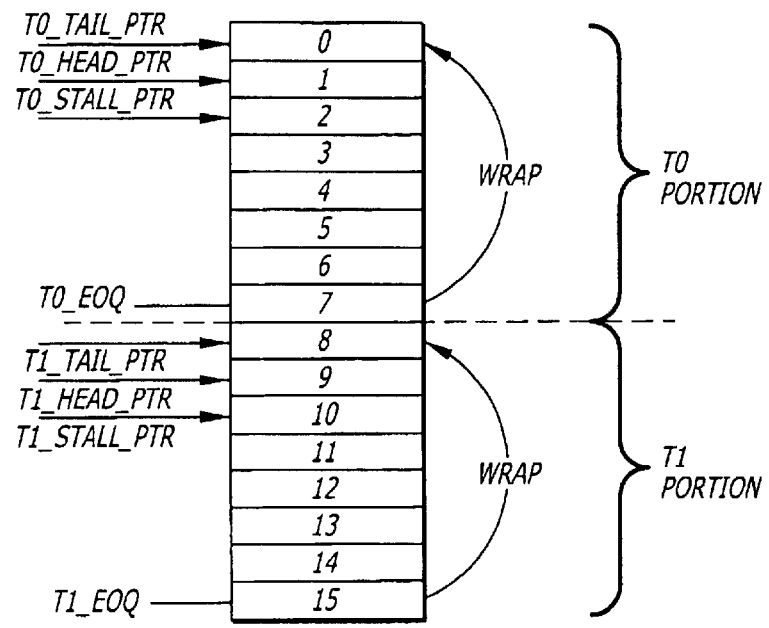
FIG. 4*b* illustrates a structure of one embodiment of a circular queue in a multithreading mode.

FIGS. 4a and 4b illustrate an example of a circular queue Q containing a predetermined number of entries, for example 16, that is used for the allocation of the working thread in ST mode and for the allocation of both threads 0 and 1 in MT mode. In ST mode, depending upon which thread is the working thread, either the thread 0 or thread 1 pointers are used for the resource computation and allocation with respect to Q. In MT mode, two sets of pointers are used. Referring to FIG. 4a, it is assumed that thread 0 is the working thread in ST mode. The circular queue Q contains 16 entries, entry 0 through entry 15. Since thread 0 is the working thread, the set of pointers used for the allocation in this case is the thread 0 set of pointers: T0_TAIL_PTR, T0_HEAD_PTR, and T0_STALL_PTR. Since the entire queue is assigned to the working thread in ST mode, the end of queue in this case points to entry 15 in the queue. Since the queue Q is circular, the T0_TAIL_PTR, T0_HEAD_PTR, and T0_STALL_PTR will wrap around when they are advanced past entry 15 in the queue. In ST mode, the allocation in the exemplary queue Q is performed serially starting from entry 0. Since the pointers can wrap around, it is necessary to keep track of the wrap around situation so that the resource computation and resource allocation with respect to Q can be performed correctly. In one embodiment, a wrap bit is used to keep track of the wrap around situation with respect to each pointer. At the start of thread 0 execution or in response to a break event as described above, the thread 0 pointers and their associated wrap bits for Q are initialized to their appropriate values assuming that thread 0 is the working thread. In one embodiment, T0_TAIL_PTR, T0_READ_PTR, and T0_STALL_PTR are initialized to point to the first entry, i.e. entry 0, in the queue Q and their corresponding wrap bits are set to 0, to indicate that the queue Q is empty at this stage. As entries for the input UOPs are being allocated, the T0_HEAD_PTR is updated to reflect the allocations made. Similarly, as entries in the queue are being freed up or deallocated, the T0_TAIL_PTR is updated accordingly to reflect the deallocations made. The T0_STALL_PTR is used to compute whether there are sufficient available entries in the queue to accommodate the input UOPs. The value of the wrap bit for each pointer is toggled between 0 and 1 each time that particular pointer is advanced past the end of queue, i.e. entry 15.

FIG. 4b illustrates an exemplary queue Q containing 16 entries that are to be allocated for thread 0 and thread 1 in MT mode. One portion of the queue, entries 0–7, is reserved for thread 0 allocation while the other portion of the queue, entries 8–15, is reserved for thread 1 allocation.

Accordingly, thread 0 end of queue (T0_EOQ) points to entry 7 and thread 1 end of queue (T1_EOQ) points to entry 15. One set of pointers (T0_TAIL_PTR, T0_HEAD_PTR, T0_STALL_PTR) is used for resource computation and allocation with respect to the portion reserved for thread 0 and another set of pointers (T1_TAIL_PTR, T1_HEAD_PTR, T1_STALL_PTR) is used for the resource computation and allocation with respect to the portion reserved for thread 1. At the start of MT execution mode, the respective pointers for thread 0 and thread 1 are initialized to their corresponding values based upon the partitioning scheme implemented. In this example, since the queue is partitioned into two equal portions, T0 pointers are initialized to point to the beginning of the queue, i.e. entry 0, and the T1 pointers are initialized to point to the middle of the queue, i.e., entry 8. The corresponding wrap bits for both thread 0 and thread 1 pointers are also initialized accordingly, for example to 0. In this example, both portions of the queue Q are configured to be circular. Accordingly, T0 pointers will wrap around to entry 0 as they are advanced past entry 7. Similarly, T1 pointers will wrap around to entry 8 as they are advanced past entry 15. A separate wrap bit is used to keep track of the wrap around situation for each pointer of each thread with respect to its respective portion of the queue. For example, the value of the wrap bit for each thread 0 pointer (T0_WBIT) is toggled each time that particular thread 0 pointer is advanced past entry 7. Similarly, the value of the wrap bit for each thread 1 pointer (T1_WBIT) is toggled each time that particular thread 1 pointer is advanced past entry 15. The values of T0_TAIL_PTR, T0_STALL_PTR and the corresponding wrap bits for T0_TAIL_PTR and T0_STALL_PTR are used to determine the number of entries available in T0 portion of the queue for thread 0 allocation. Similarly, the values of T1_TAIL_PTR, T1_STALL_PTR and the corresponding wrap bits for these two pointers are used to determine the number of entries available in T1 portion of the queue for thread 1 allocation.

In the present embodiment, if the required resources are not available to execute the input UOPs within a particular thread, the ALF unit 311 will generate a stall signal with respect to that particular thread to inform the TDE 230 and other units within the microprocessor that they need to stall until the stall conditions are cleared. In one embodiment, stalling means that the ALF 311 and the RAT 301 will not get any new valid UOPs to allocate and therefore no new valid UOPs will be transferred to the rest of the processor down the pipeline. In addition, the TDE 230 needs to stop fetching new UOPs because the last set of UOPs that were fetched cannot be allocated due to the stall condition caused by insufficient resources. Since there are two threads, thread 0 and thread 1, that can be executed concurrently, either thread 0 or thread 1 or both threads can be stalled due to insufficient resources. Accordingly, there are two separate stall signals, one for each thread, that can be activated by the ALF 311 if there are insufficient resources to satisfy the resource requirements of the input UOPs. The thread 0 stall signal, referred to as ALSTALLT0, is activated by the ALF 311 if there are not enough resources to allocate the input UOPs in thread 0. Likewise, the thread 1 stall signal, referred to as ALSTALLT1, is activated by the ALF 311 if there are not enough resources to allocate the input UOPs in thread 1.

In one embodiment, the ALSTALL signals for both threads 0 and 1 are determined in every clock if the processor is running in MT mode. In ST mode, there is only one ALSTALL signal. It can be either ALSTALLT0 or ALSTALLT1 based upon the working thread. In MT mode, when only ALSTALLT0 is asserted, the TDE 230 can drive one of the following to the RRRR cluster: (1) valid UOPs from thread 1; (2) invalid UOPs; or (3) the stalled UOPs from thread 0. Similarly, if only ALSTALLT1 is asserted, the TDE 230 can drive to the RRRR cluster either valid UOPs from thread 0, invalid UOPs, or the stalled UOPs from thread 1. When both ALSTALLT0 and ALSTALLT1 are asserted, the TDE 230 can drive either the stalled UOPs from thread 0, the stalled UOPs from thread 1, or invalid UOPs. In one embodiment, the earliest that the ALF 311 will be able to allocate the stalled UOPs is two clocks after the stall signal corresponding to that thread becomes inactive. In order for the ALF 311 to allocate in two clocks, the TDE 230 needs to drive the stalled UOPs on the last clock that the stall signal corresponding to that thread is still active.

In one embodiment, to enable the stall computation, an additional clock is added to the RRRR interface with the TDE. The first clock is used to perform the stall computation and the allocation is done in the next clock if there is no stall. The stall is computed for a set of three UOPs every medium clock. As mentioned above, actual resource computation and allocation is done with respect to the GIAQ 325, MIAQ 323, load buffer, and store buffer while block computation and allocation is done with respect to the FLM 315, ROB 331, and the IDQ 327. As discussed above, the stall signal for a particular thread will be activated if there are insufficient entries in one or more of the resources to allocate for the input UOPs.

In one embodiment, there is a separate stall block computation for each thread. In one embodiment, when the processor is running in MT mode, the stall computation for thread 0 and the stall computation for thread 1 are performed in parallel in every clock even though there is only one thread to be allocated in each clock.

Figure 5:
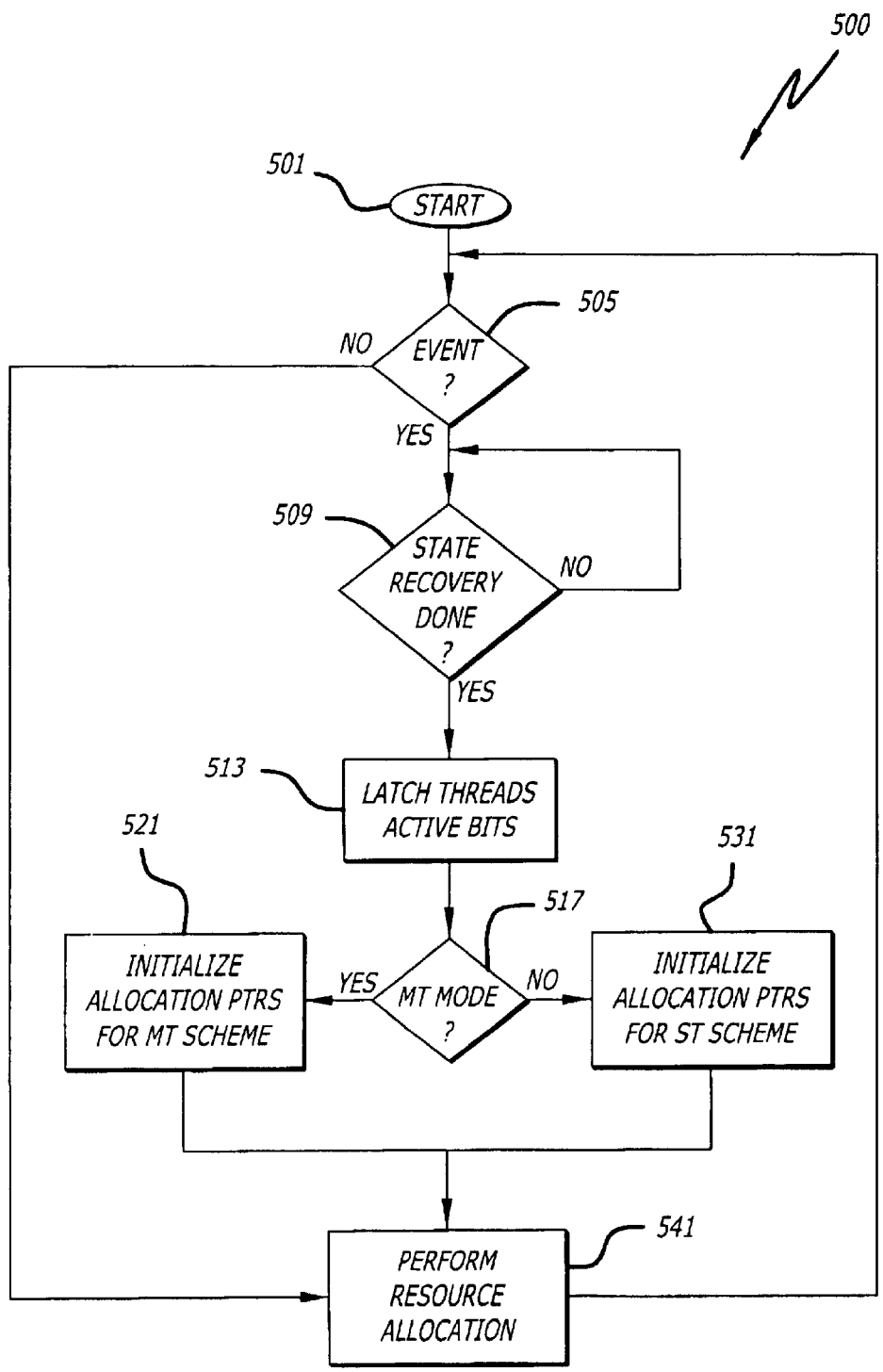
FIG. 5 is a high level flow diagram of one embodiment of a method for managing resources in a multithreaded processor.

FIG. 5 illustrates a high level flow diagram of one embodiment of a method 500 for managing various resources in the multithreaded processor 200. In one embodiment, a control signal indicating the corresponding execution mode is set to a first value, for example 0, to indicate that the single threading mode is active and set to a second value, for example 1, to indicate that the multithreading mode is active. In one embodiment, the processor 200 waits for the state recovery to complete before it can transition from one execution mode to another execution mode. Whenever the ROB 331 detects an event condition, it asserts the signal CRNuke which causes all the UOPs being processed but not yet retired or committed to be flushed.

With continuing reference to FIG. 5, the method 500 starts at 501. At decision block 505, the method 500 proceeds to block 509 if an event has been detected. Otherwise it proceeds to block 541. In one embodiment, an event can be an internal or external event or a condition detected by the ROB 331 which then generates a CRNuke signal as described above. In one embodiment, one or more signals are generated to indicate that state recovery is complete. One example of such a signal is that after the state in the RAT 311 is recovered and all physical registers are freed then a state recovery done signal is asserted. When all such state recovery done signals are asserted then the state recovery is considered complete. At decision block 509, the method 500 proceeds to block 513 if the state recovery is completed. At block 513, the thread active bits are latched. The method 500 then proceeds from block 513 to decision block 517 to determine whether the processor is to run in MT or ST mode. The method 500 then proceeds to block 521 if MT mode is indicated and to block 531 if ST mode is indicated. At block 521, the allocation pointers for both threads 0 and 1 are initialized according to a predetermined MT scheme. At block 531, the allocation pointers for the working thread are initialized according to a predetermined ST scheme. The method then proceeds from either block 521 or block 531 to block 541 to perform the resource allocation task according to either the ST scheme or MT scheme. The method then loops back from block 541 to block 505.

Figure 6:
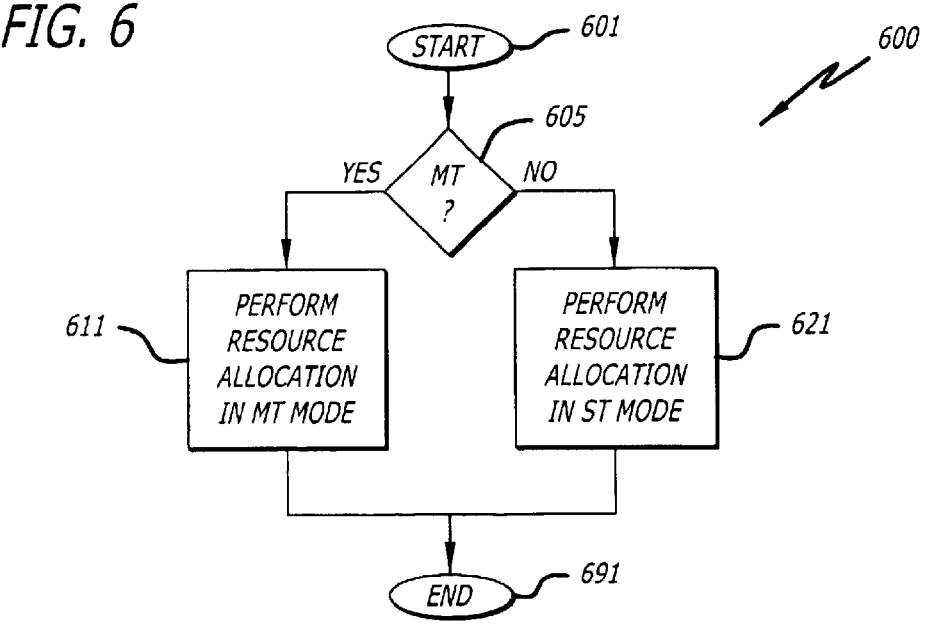
FIG. 6 shows a high level flow chart of one embodiment of a method for performing resource allocation in a multithreaded processor.

FIG. 6 shows a high level block diagram of a resource allocation process 600 performed at block 541 in FIG. 5. The process starts at block 601 and proceeds to block 605. At decision block 605, the process proceeds to block 611 to perform resource allocation in MT mode if MT mode is indicated. Otherwise, it proceeds to block 621 to perform resource allocation in ST mode. The process then proceeds to end at block 691.

Figure 7:
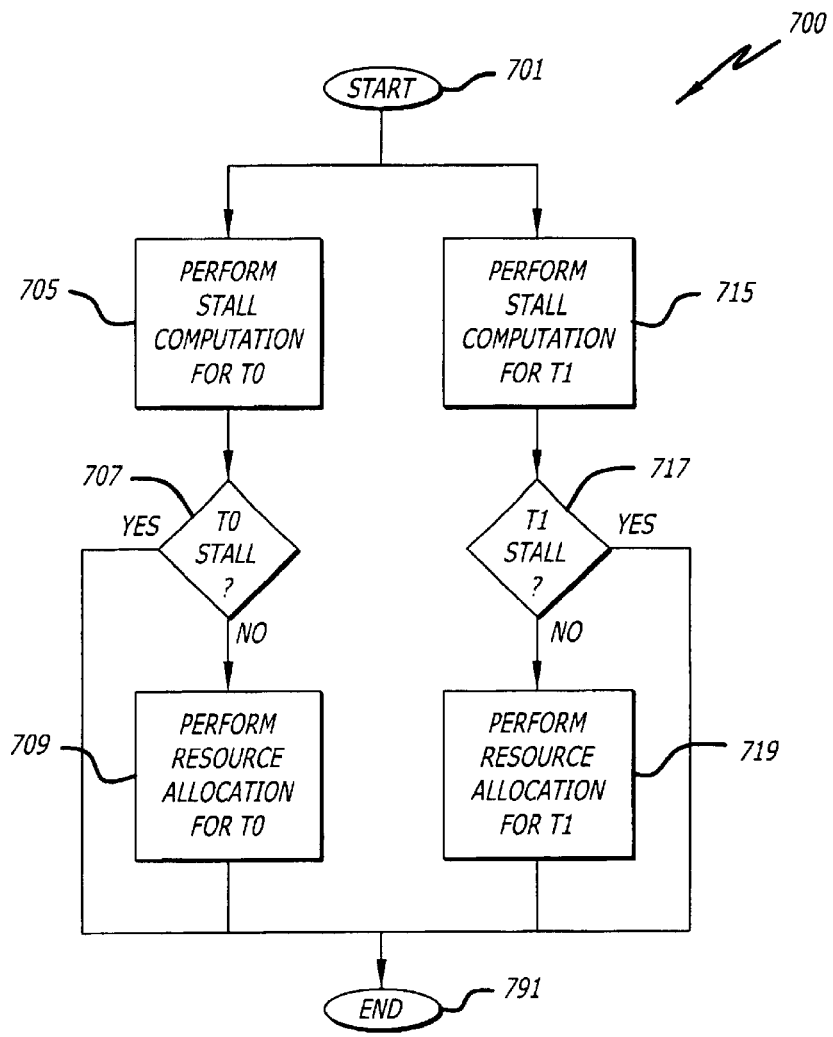
FIG. 7 is a flow diagram of one embodiment of a method for performing resource allocation between two threads in a multithreaded processor.

FIG. 7 is a high level flow diagram of one embodiment of a resource allocation process in MT mode 700 performed at block 611 in FIG. 6. In this embodiment, the allocation process is performed in parallel for both thread 0 and thread 1. The process starts at block 701 and proceeds in parallel to both blocks 705 and 715 to perform stall computation for thread 0 and thread 1, respectively. The stall computation for thread 0 and thread 1 will be discussed in more detail below. The process then proceeds in parallel from blocks 705 and 715 to blocks 707 and 717, respectively. At decision block 707, the process proceeds to block 709 if T0 is not stalled. Otherwise the process proceeds to end at block 791. At decision block 717, the process proceeds to block 719 if T1 is not stalled. Otherwise the process proceeds to end at block 791. At block 709, resource allocation for thread 0 is performed. At block 719, resource allocation for thread 1 is performed. The resource allocation performed at blocks 709 and 719 will be described in more detail below. The process then proceeds to end at block 791.

Figure 8:
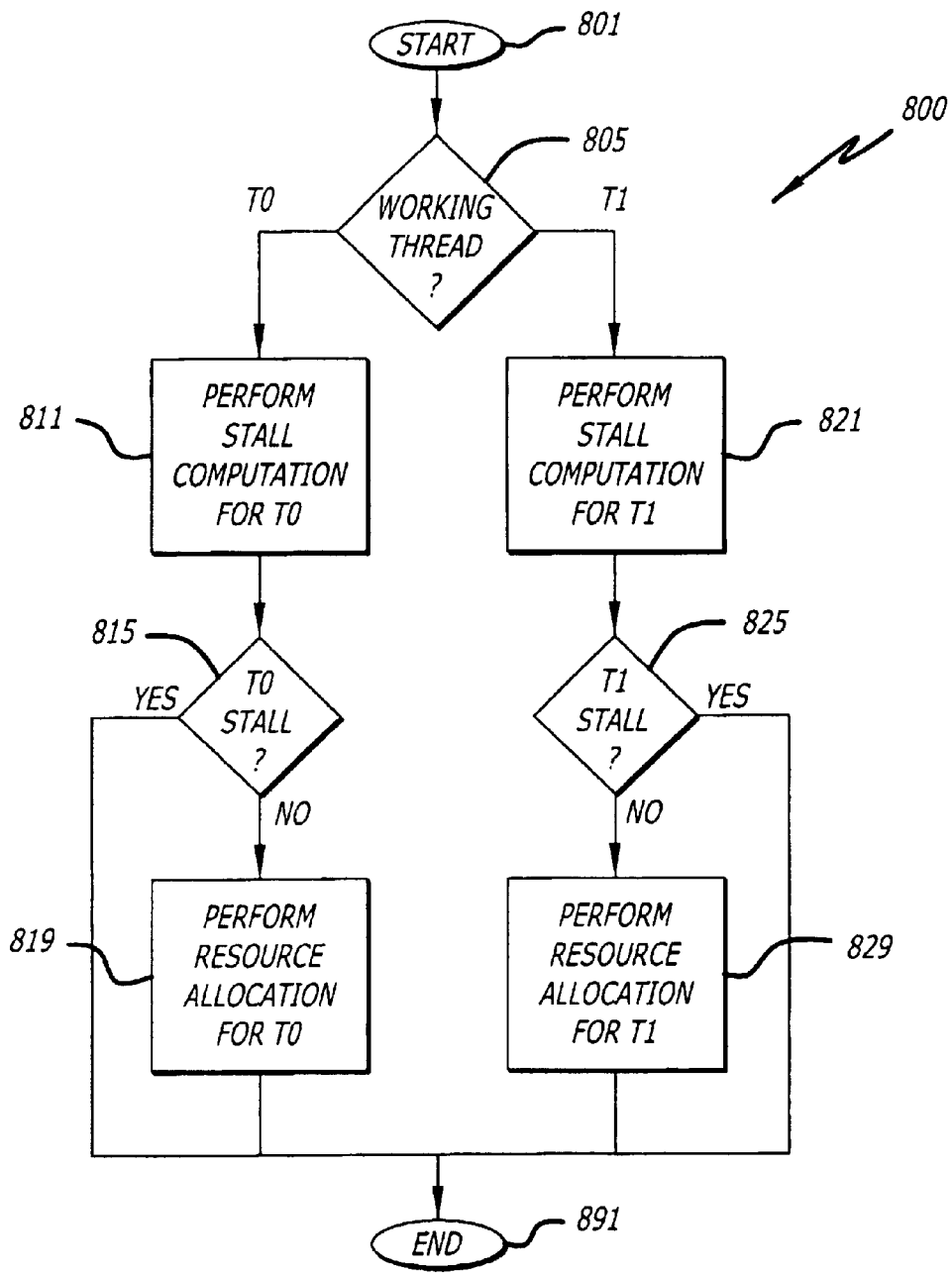
FIG. 8 is a flow chart of another embodiment of a method for performing resource allocation between two threads in a multithreaded processor.

FIG. 8 illustrates a high level flow diagram of another embodiment of an MT resource allocation process 800 performed at block 611 in FIG. 6. In this embodiment, both the stall computation and the resource allocation for each of the two threads 0 and 1 are performed in a multiplexed manner based upon the thread ID associated with the input UOPs received from the TDE 230. The process begins at block 801 and proceeds to decision block 805. At decision block 805, the process proceeds to block 811 if the UOPs received from the TDE come from thread 0. Otherwise, the process proceeds to block 821. As described above, in one embodiment, each UOP received from the TDE 230 is tagged with a thread bit indicating the particular thread to which it belongs. In one embodiment where there are two threads being executed concurrently in the MT mode, the thread bit is set to one value, for example 0, to indicate that the respective UOP is in thread 0 and set to another value, for example 1, to indicate that the respective UOP is in thread 1. At block 811, stall computation for thread 0 is performed to determine whether there are sufficient resources to execute the input UOPs from thread 0. The process then proceeds from block 811 to decision block 815. At decision block 815, the process proceeds to block 819 to perform resource allocation for the respective UOP if there are sufficient resources available. Otherwise the process proceeds to end at block 891. Referring back to block 821, stall computation for thread 1 is performed in this block to determine whether there are sufficient resources to execute the input UOPs from thread 1. The process then proceeds from block 821 to decision block 825. At decision block 825, the process proceeds to block 829 to allocate the necessary resources for the respective UOPs if there are sufficient resources available. Otherwise, the process proceeds to end at block 891. The process then proceeds from either block 819 or block 829 to end at block 891.

Figure 9:
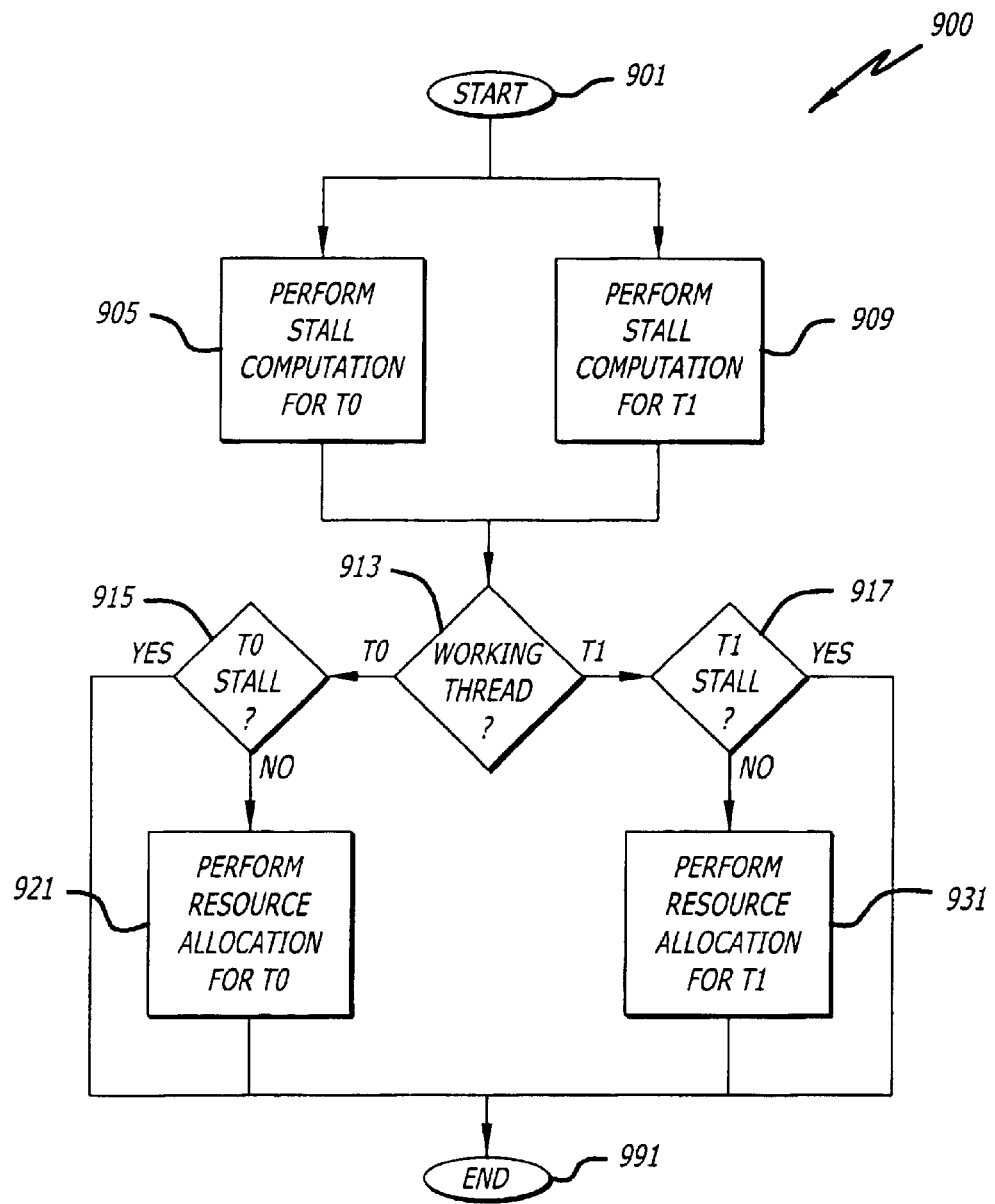
FIG. 9 is a flow chart of another embodiment of a method for performing resource allocation between two threads in a multithreaded processor.

FIG. 9 is a high level flow diagram of another embodiment of an MT resource allocation process 900 performed at block 611 in FIG. 6. In this embodiment, the stall computations for thread 0 and thread 1 are performed in parallel while the resource allocations for thread 0 and thread 1 are multiplexed. The process starts at block 901 and proceeds to perform the stall computation for thread 0 and thread 1 in parallel at block 905 and block 909, respectively. The process then proceeds from blocks 905 and 909 to decision block 913 to determine whether the input UOPs received in the current clock cycle belong to thread 0 or thread 1. As described above, each input UOP received from the TDE 230 is tagged with a tag bit indicating the corresponding thread to which the respective UOP belongs. The process then proceeds from decision block 913 to block 915 if the respective UOP belongs to thread 0, otherwise it proceeds to block 917. At decision block 915, the process proceeds to block 921 to perform resource allocation for thread 0 if thread 0 is not stalled. Otherwise, the process proceeds to end at block 991. At decision block 917, the process proceeds to block 931 to perform resource allocation for thread 1 if thread 1 is not stalled. Otherwise the process proceeds to end at block 991. The process then proceeds from either block 921 or 931 to end at block 991. In one embodiment, both the resource computation and the resource allocation tasks are performed in the same clock cycle. In another embodiment, the stall computation for each thread is performed in one clock cycle while the resource computation for the working thread is performed in the next clock cycle.

Figure 10:
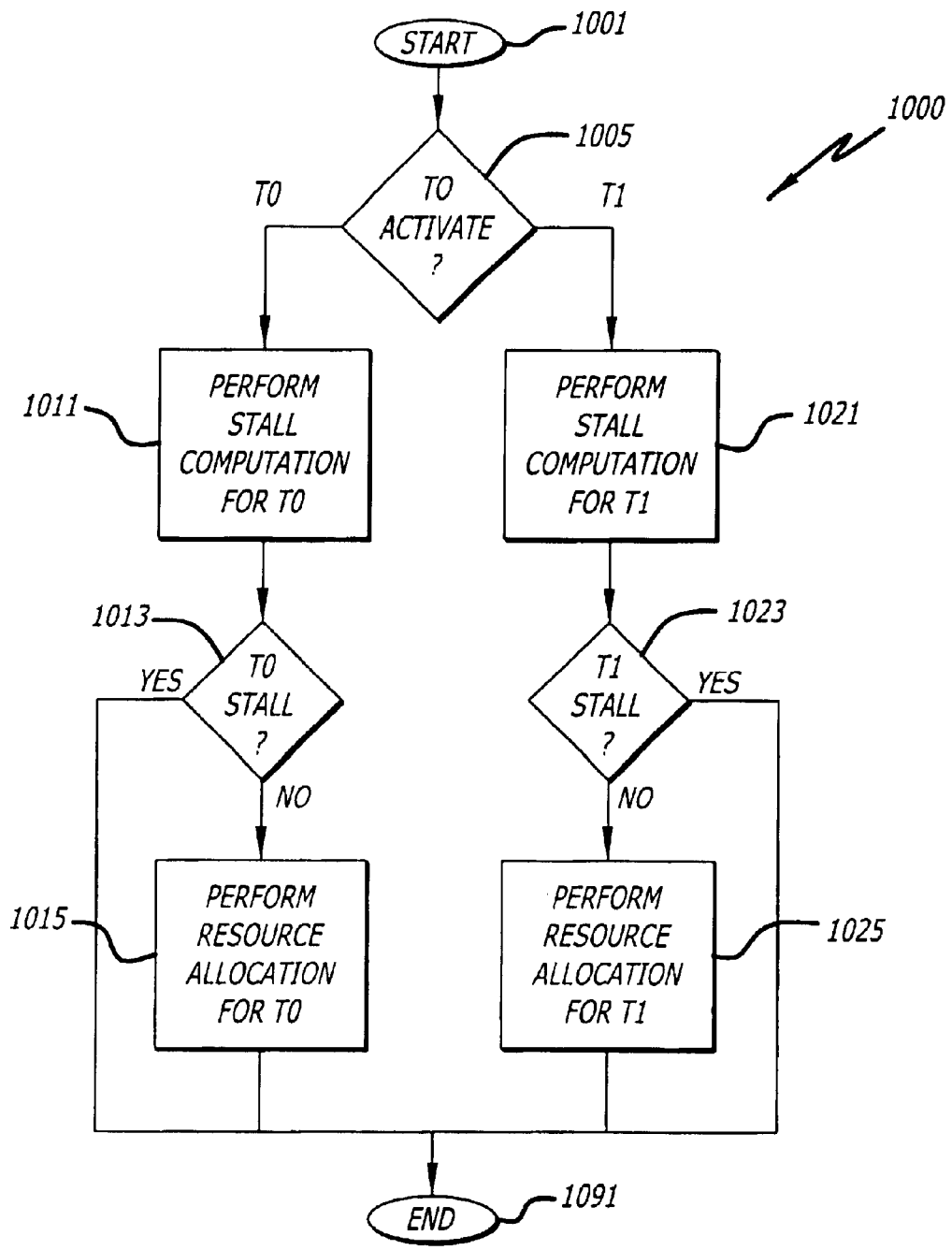
FIG. 10 illustrates a high level flow chart of one embodiment of a method for performing resource allocation in a multithreaded processor running in a single threading mode.

FIG. 10 shows a high level flow diagram of one embodiment of an ST resource allocation process 1000 performed at block 621 in FIG. 6. As discussed above, in the ST running mode, there is only one thread being executed and it is considered the working thread. The process begins at block 1001 and proceeds to decision block 1005. At decision block 1005, the process proceeds to block 1011 if the working thread is thread 0 or to block 1021 if the working thread is thread 1. As mentioned above, a thread active bit is maintained with respect to each thread being executed to indicate whether that particular thread is being active. In ST mode, either thread 0 or thread 1 is the working thread. In one embodiment, a separate thread active bit is maintained for each thread and is set to a first value to indicate that it is active and set to a second value otherwise. At block 1011, stall computation is performed with respect to thread 0 to determine whether there are sufficient resources to execute the input UOPs received from the TDE 230. The process then proceeds from block 1011 to decision block 1013. At decision block 1013, the process proceeds to block 1015 to allocate the necessary resources for the respective thread 0 UOPs if the thread 0 stall signal is inactive. Otherwise, the process proceeds from decision block 1013 to end at block 1091. Referring back to decision block 1005, the process proceeds to block 1021 if the working thread is thread 1. At block 1021, stall computation is performed with respect to thread 1 to determine whether there are sufficient resources to execute the input thread 1 UOPs received from the TDE 230. At decision block 1023, the process proceeds to block 1025 to allocate the necessary resources for the execution of the input thread 1 UOPs if the thread 1 stall signal is inactive. Otherwise, the process proceeds to end at block 1091. As discussed above, in the ST mode, the resources are allocated to the active or working thread, either thread 0 or thread 1. If it is determined that there are insufficient resources to execute the input UOPs for the working thread fetched from the TDE 230, the ALF 311 generates the appropriate stall signal for the working thread, either thread 0 or thread 1, to inform the TDE 230 and other units within the microprocessor that the coming UOPs cannot be executed. In this case, the TDE 230 needs to stall further fetching of UOPs to the RRRR 300 until the conditions that cause the stall are cleared.

Figure 11:
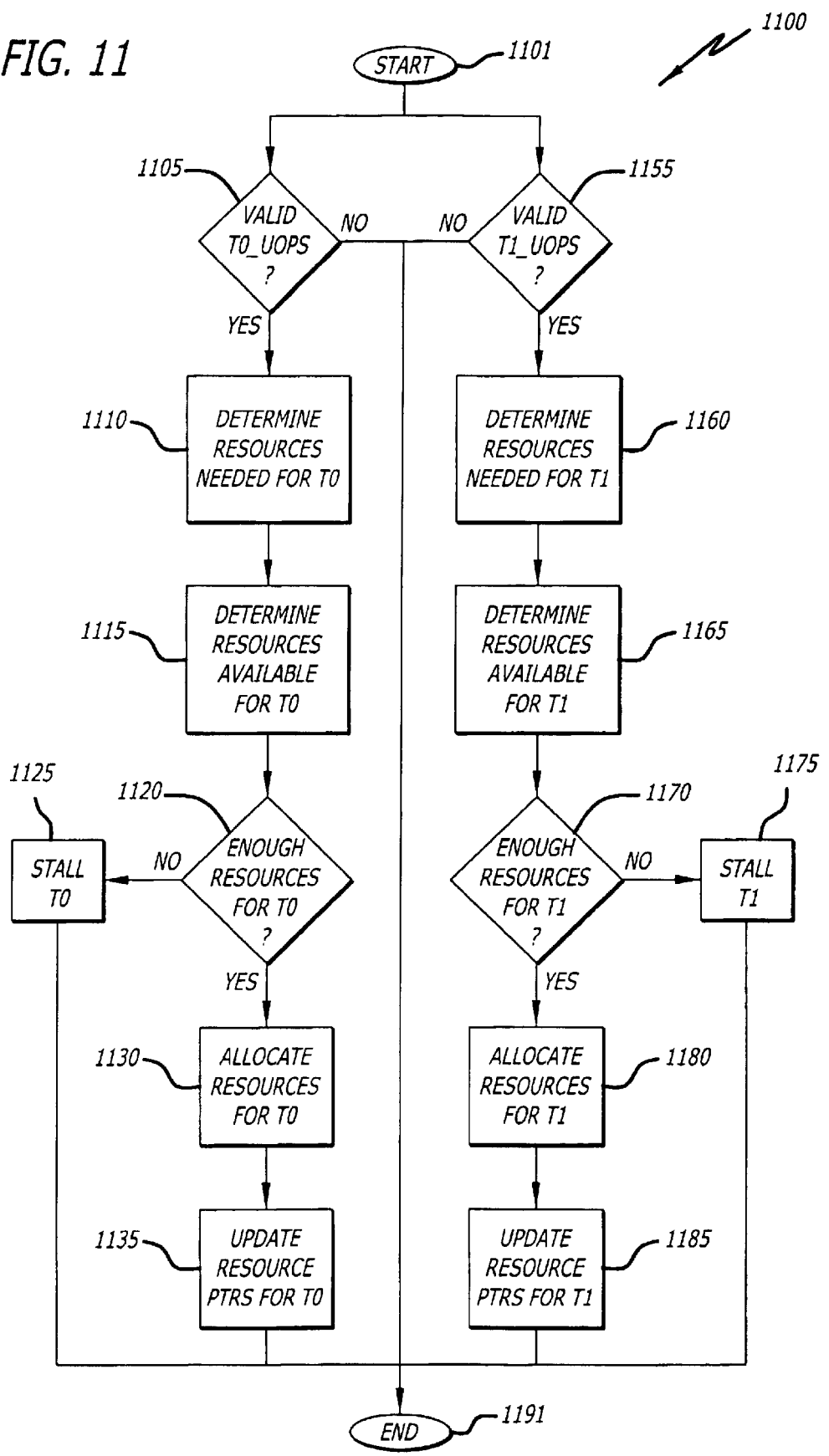
FIG. 11 is a flow diagram of one embodiment of a method for performing resource allocation for two threads in a parallel structure.

FIG. 11 illustrates a more detailed flow diagram of one embodiment of the MT parallel resource allocation process described in FIG. 7 above. As discussed above, in this embodiment, both the stall computation and resource allocation for thread 0 and thread 1 are performed in parallel. The process begins at block 1101 and proceeds in parallel to both blocks 1105 and 1155. At decision block 1105, the process continues to block 1110 if the input UOPs for thread 0 are valid. Otherwise, the process proceeds to end at block 1191 with respect to thread 0. At decision block 1155, the process proceeds to block 1160 if the input UOPs for thread 1 are valid. Otherwise the process proceeds to end at block 1191 with respect to thread 1. As discussed above, in one embodiment, each UOP received from the TDE 230 is supplied with a valid bit indicating whether that particular UOP is valid. The TDE 230 is responsible for supplying the correct valid bits for the UOPs that it fetches to the RRRR cluster 300. At blocks 1110 and 1160, the ALF unit 311 determines the resources needed for the execution of thread 0 UOPs and thread 1 UOPs, respectively. The process then proceeds from block 1110 to block 1115 and from block 1160 to block 1165. At block 1115, the amount of resources available for thread 0 execution is determined. At block 1165, the amount of resources available for thread 1 execution is determined. The process then continues from blocks 1115 and 1165 to blocks 1120 and 1170, respectively. At decision block 1120, the process proceeds to block 1125 to activate the stall signal for thread 0 if there are insufficient resources available to execute the input UOPs from thread 0. Otherwise, the process proceeds to block 1130 to allocate the required resources for the execution of the input thread 0 UOPs. The process then continues from block 1130 to block 1135 to update the resource allocation pointers for thread 0 to keep track of the amount of resources allocated in block 1130. The process then proceeds from either block 1125 or block 1135 to end at block 1191. Referring back to block 1165, the process proceeds from block 1165 to block 1170. At decision block 1170, the process proceeds to block 1175 to activate the stall signal for thread 1 if there are insufficient resources to handle the execution of thread 1 UOPs. Otherwise the process continues to block 1180 to allocate the necessary resources for thread 1 UOPs. The process then proceeds from block 1180 to block 1185 to update the resource allocation pointers for thread 1 to keep track of the amount of resources allocated in block 1180. The process then proceeds from either block 1175 or block 1185 to end at block 1191.

Figure 12:
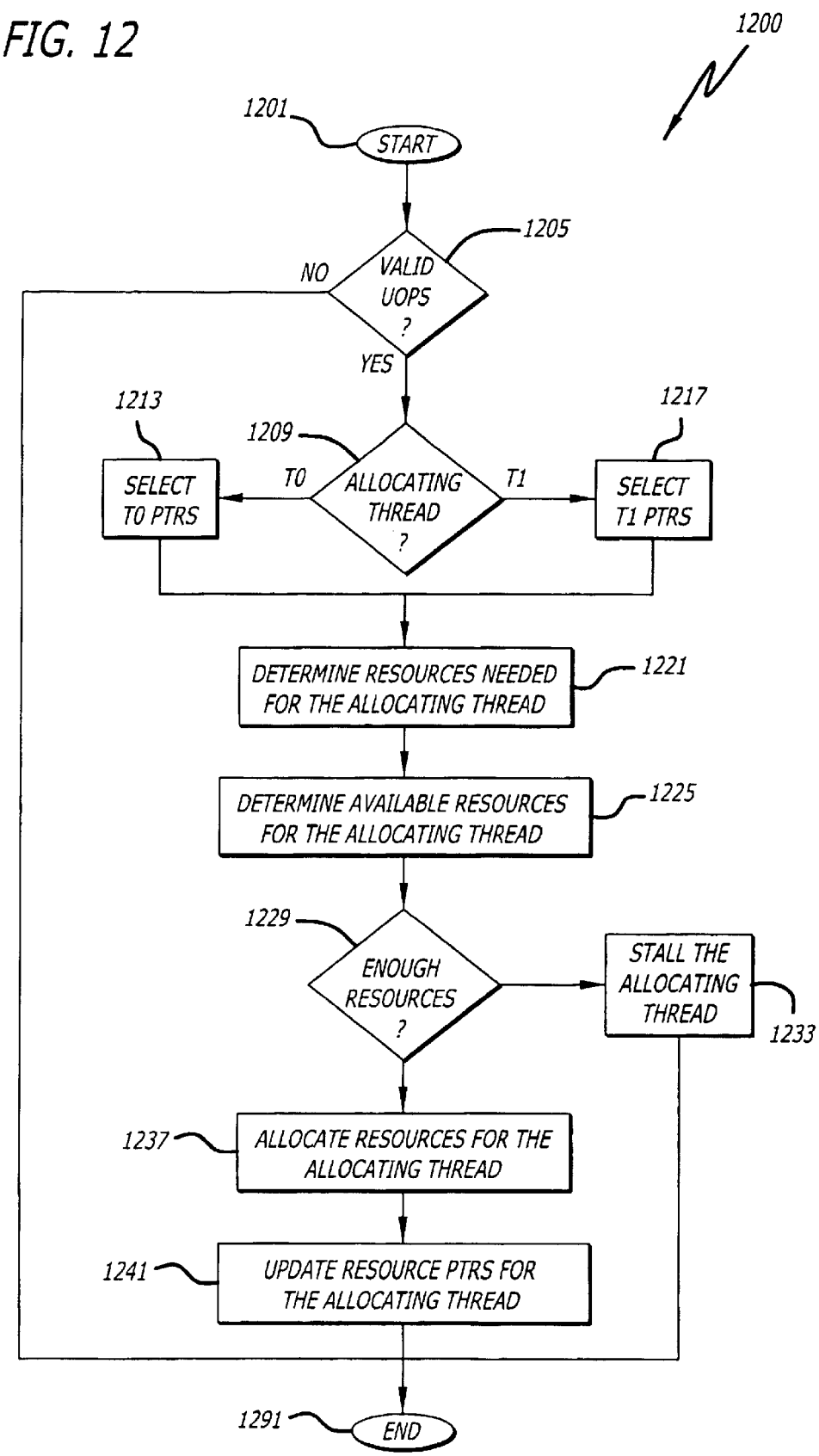
FIG. 12 is a flow diagram of one embodiment of a method for performing resource allocation for two threads in a multiplexing manner.

FIG. 12 shows a more detailed flow diagram of one embodiment of the MT resource allocation process described in FIG. 8 above. In this embodiment, both the resource computation and resource allocation for thread 0 and thread 1 are multiplexed. The process starts at block 1201 and proceeds to decision block 1205. At decision block 1205, the process continues to block 1209 if the input UOPs are valid. Otherwise the process proceeds to end at block 1291. At decision block 1209, the process proceeds to block 1213 to select the appropriate pointers for thread 0 if thread 0 is the current working thread. Otherwise, the process proceeds to block 1217 to select the appropriate thread 1 pointers. The process then proceeds from either block 1213 or block 1217 to block 1221 to determine the amount of resources required to execute the input UOPs for the current working thread. The process then continues to block 1225 to determine the amount of available resources for the working thread using the appropriate pointers selected. At decision block 1229, the process proceeds to block 1233 to activate the stall signal for the current working thread, either thread 0 or thread 1, if there are not enough resources to handle the execution of the input UOPs for the working thread. If there are enough resources available, the process proceeds from decision block 1229 to block 1237 to allocate the required resources for the current input UOPs. Resource allocation pointers for the current working thread are then updated accordingly at block 1241 to keep track of the amount of resources allocated to the working thread. The process then proceeds from either block 1233 or block 1241 to end at block 1291.

Figure 13:
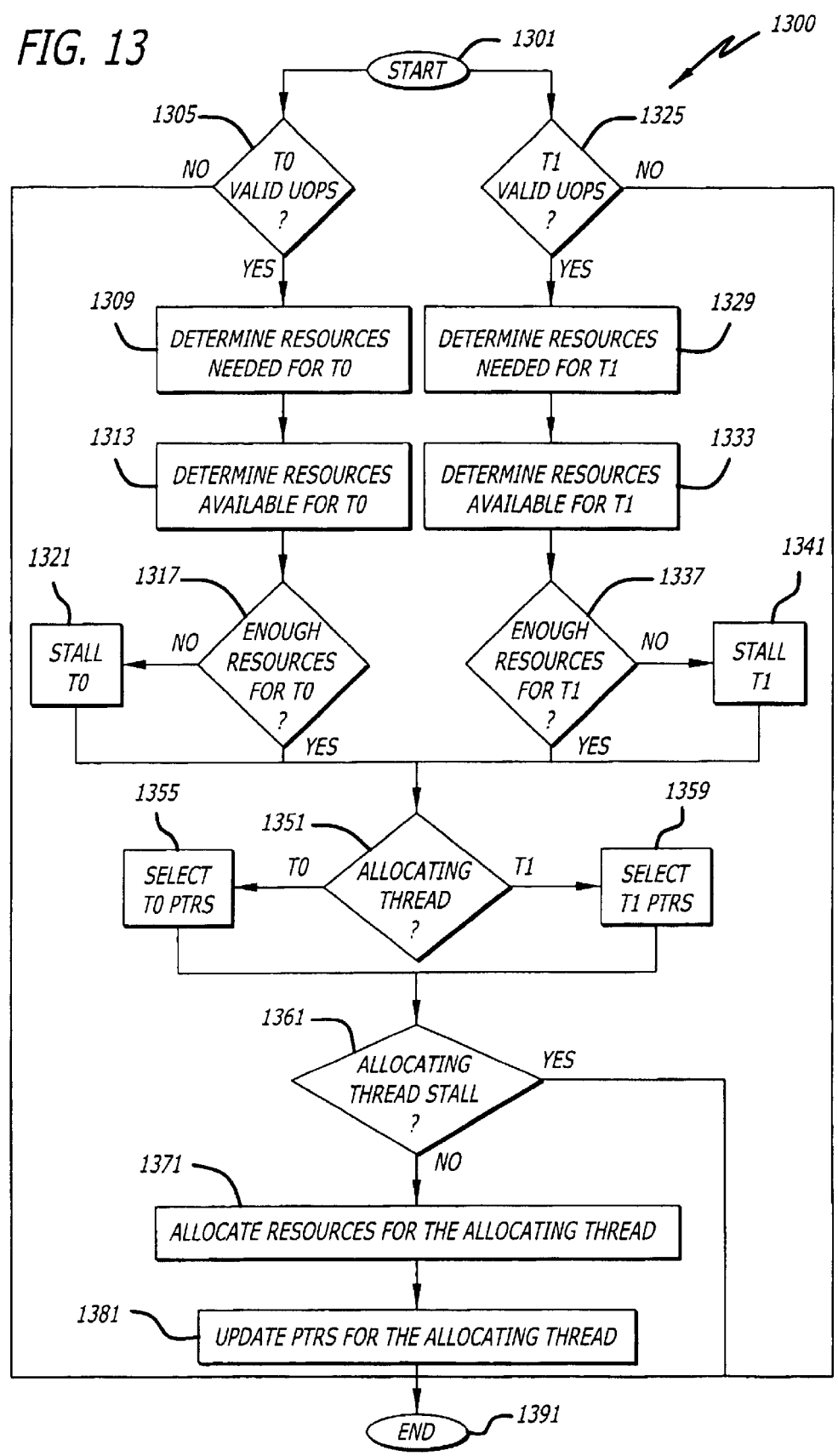
FIG. 13 illustrates a flow diagram of one embodiment of a method for performing stall computation for two threads in parallel and resource allocation in multiplexed manner.

FIG. 13 illustrates a more detailed flow diagram of one embodiment of the MT resource allocation process described in FIG. 9 above. In this embodiment, the resource stall computation for both thread 0 and thread 1 are done in parallel but the resource allocation is only performed for the current working thread, i.e., resource allocation for thread 0 and thread 1 is multiplexed.

The process begins at block 1301 and proceeds in parallel to both blocks 1305 and 1325. At decision block 1305, the process proceeds to end at block 1391 if the T0 input UOPs are invalid. Otherwise it proceeds to block 1309 to determine the resources required for the execution of the T0 input UOPs. The process then continues to block 1313 to determine the amount of resources available for thread 0 execution. At decision block 1317, the process proceeds to block 1321 to activate the stall signal for thread 0 if there are insufficient resources to handle the execution of the T0 input UOPs. Otherwise the process proceeds to decision block 1351. Referring back to decision block 1325, the process proceeds to end at block 1391 if the T1 input UOPs are invalid. Otherwise it proceeds to block 1329 to determine the resources required for the execution of the T1 input UOPs. The process then continues to block 1333 to determine the amount of resources available for thread 1 execution. At decision block 1337, the process proceeds to block 1341 to activate the stall signal for thread 1 if there are insufficient resources to handle the execution of the T1 input UOPs. Otherwise the process proceeds to decision block 1351. At decision block 1351, the process proceeds to block 1355 to select the appropriate thread 0 pointers if thread 0 is the current working thread, otherwise the process proceeds to block 1359 to select the appropriate thread 1 pointers. The process then continues to block 1361 from either block 1355 or block 1359. At decision block 1361, the process proceeds to end if the stall signal for the current working thread is activated, otherwise it proceeds to allocate the necessary resources for the current working thread, either thread 0 or thread 1, at block 1371. The process then proceeds from block 1371 to block 1381 to update the appropriate allocation pointers for the current working thread. The process then proceeds to end at block 1391.

Figure 14:
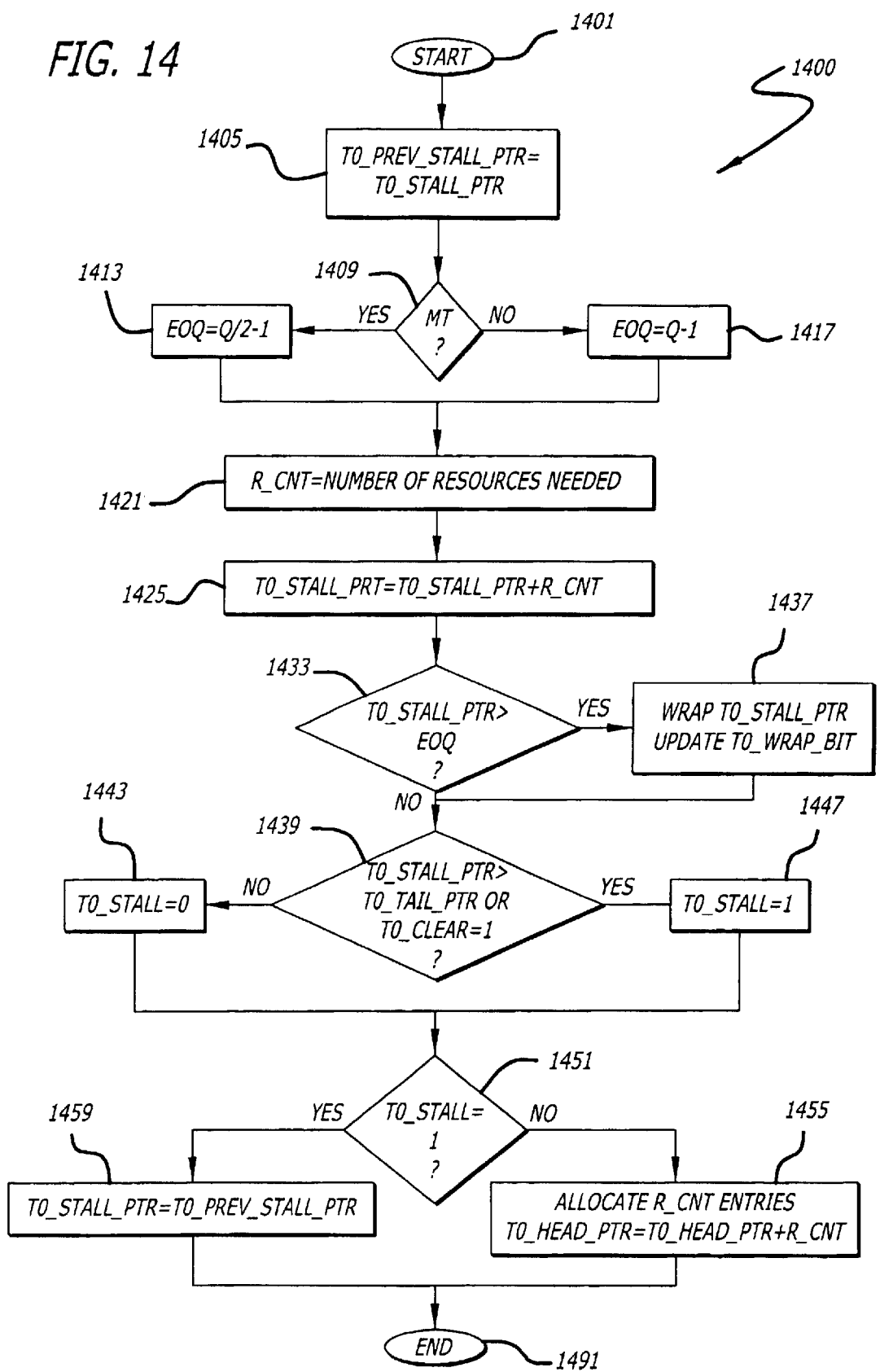
FIG. 14 is a detailed flow diagram for performing resource allocation for one of the two threads.

FIG. 14 shows a flow diagram of one embodiment of the resource computation and resource allocation process for thread 0 according to the teachings of the present invention.

As described above, in order to perform the resource computation and resource allocation for each thread, the ALF 311 utilizes and maintains a separate set of pointers for each respective thread. For each resource, the ALF 311 maintains a set of pointers including a head pointer, a tail pointer, and a stall pointer for each thread to compute the amount of available entries in the resource and to allocate the appropriate entries in the resource as required for the execution of each UOP within each thread. In the discussion that follows, the process is discussed with respect to a particular queue, for example, the instruction queue as one of the resources needed for the execution of a particular UOP within thread 0 even though everything discussed herein is equally applicable to the resource computation and resource allocation with respect to other resources. As discussed above, in ST mode, each resource is wholly dedicated to serving the working thread, either thread 0 or thread 1. In MT mode, each resource is partitioned into two portions. One portion is reserved for thread 0 while the other portion is reserved for thread 1. In one embodiment, the lower or first half of the queue is reserved for use by thread 0 and the upper or second half of the queue is reserved for use by thread 1. Accordingly, there are two sets of pointers that are used to perform the resource computation and resource allocation for each resource with respect to thread 0 and thread 1. In the present example, assuming that the size of the queue is Q, and the first entry in the queue is 0, then the end of the queue (EOQ) is designated as Q−1 in ST mode. In MT mode, with respect to thread 0 the beginning of queue is 0 and the end of queue is Q/2−1, whereas for thread 1 the beginning of queue is Q/2 and the end of queue is Q−1. It should be understood and appreciated by one skilled in the art that the teachings of the present invention should not in anyway be limited to the equal partitioning of the queue or resource. The teachings of the present invention are applicable to any other schemes or ways of resource partition (e.g., unequal partition). For example, a resource can be partitioned into two or more unequal portions based on various factors or criteria including, but are not limited to, the number of threads being executed concurrently, the capacity of the resource, the relative processing priority of each thread, etc. As an example, a resource can be partitioned into two unequal portions in which ¼ of the resource is reserved for one thread (e.g., Q/4) and ¾ of the resource is reserved for another thread (3Q/4).

Continuing with the present discussion with respect to thread 0 resource computation and allocation process, it should be noted, as explained above, that after the CRNuke signal is asserted and the event is done with respect to thread 0 and thread 1, the associated pointers for each resource are initialized to the appropriate values depending on whether the processor is to run in ST mode or MT mode. In ST mode, either the set of pointers for thread 0 or the set of pointers for thread 1 are initialized depending on whether thread 0 or thread 1 is the working thread. For example, if thread 0 is the working thread in ST mode, then T0_HEAD_PTR, T0_TAIL_PTR, and T0_STALL_PTR are initialized to 0 and the end of queue value is Q−1 where Q is the size of the particular resource to be allocated for the execution of thread 0 UOPs. Similarly, when thread 1 is the working thread in ST mode, T1_HEAD_PTR, T1_TAIL_PTR, and T1_STALL_PTR are initialized to 0 and the end of queue value with respect to thread 1 is also Q−1. In ST mode, the whole resource is to be reserved for the working thread. In MT mode, however, the queue or the resource is partitioned into two equal portions and the sets of pointers for thread 0 and thread 1 are set to the appropriate corresponding values. For example, in MT mode, T0_HEAD_PTR, T0_TAIL_PTR, and T0_STALL_PTR are set to 0 after NUKE whereas T1_HEAD_PTR, T1_TAIL_PTR, and T1_STALL_PTR are set to Q/2 after NUKE. The end of queue with respect to thread 0 in MT mode is Q/2−1 while the end of queue with respect to thread 1 is Q−1. By setting the pointers for thread 0 and thread 1 to their corresponding values as described above, the resource or queue to be allocated is partitioned into two equal portions. In one embodiment, each queue or buffer to be allocated is configured as a circular queue or circular buffer. As such, when the pointers for each thread with respect to a particular queue or buffer are advanced past their respective end of queue, these pointers are wrapped around. A wrap bit is used to keep track of the wrap around situation with respect to each pointer of each thread. The wrap bit for each pointer of each thread is set to a first value at the start to indicate that the corresponding pointer has not been wrapped around. The value of the wrap bit for each pointer is toggled when that particular pointer is advanced past its corresponding end of queue. For example, if T0_STALL_PTR or T0_TAIL_PTR for a particular queue is advanced past Q−1 in ST mode or Q/2−1 in MT mode, then the wrap bit for T0_STALL_PTR or the wrap bit for T0_TAIL_PTR with respect to that particular queue is toggled. This wrap bit for each pointer is used in the stall computation for each resource, as described in more detail below. Again, it should be understood and appreciated by one skilled in the art that the teachings of the present invention should not in anyway be limited to the equal partitioning of the queue or resource. The teachings of the present invention are applicable to any other schemes or ways of resource partition (e.g., unequal partition). For example, a resource can be partitioned into two or more unequal portions based on various factors or criteria including, but are not limited to, the number of threads being executed concurrently, the capacity of the resource, the relative processing priority of each thread, etc. As an example, a resource can be partitioned into two unequal portions in which ¼ of the resource is reserved for one thread (e.g., Q/4) and ¾ of the resource is reserved for another thread (3Q/4).

Referring back to FIG. 14, the process begins at block 1401 and proceeds to block 1405 to set the T0_PREV_STALL_PTR to be equal to the current T0_STALL_PTR. At decision block 1409, the process proceeds to block 1413 to select Q/2−1 as the end of queue value if the processor is running in MT mode. Otherwise, the process proceeds to block 1417 to select Q−1 as the end of queue value. The process then continues from either block 1413 or block 1417 to block 1421 to compute the number of entries needed for this set of input UOPs. The process proceeds to block 1425 to compute the new value for the T0_STALL_PTR. In one embodiment, the T0_STALL_PTR is incremented by the number of entries computed in block 1421 to obtain the new value for T0_STALL_PTR. For example, T0_STALL_PTR=T0_STALL_PTR+R_CNT where R_CNT is the number of entries needed that is computed in block 1421. At decision block 1433, the process proceeds to block 1437 to wrap around the new T0_STALL_PTR and toggle the corresponding wrap bit if it advances past the respective EOQ. Otherwise the process continues to block 1439. As discussed above, since the queue to be allocated here is configured as a circular queue, once the T0_STALL_PTR advances past the EOQ it needs to be wrapped around and the corresponding wrap bit needs to be toggled accordingly. For example, if the T0_STALL_PTR=EOQ then the T0_STALL_PTR is wrapped around to 0, which is the start of the respective portion of the queue reserved for thread 0. If the T0_STALL_PTR=EOQ+1, then the T0_STALL_PTR is wrapped around to 1, which is the start of the respective portion of the queue plus 1, and so on. The process then proceeds from block 1437 to block 1439. At block 1439, the T0_STALL_PTR is compared with T0_TAIL_PTR taken into consideration the values of the wrap bits associated with T0_STALL_PTR and T0_TAIL_PTR to determine whether there are enough free entries in the queue to allocate the entries required. In one embodiment, if the wrap bit for T0_STALL_PTR is 1, the wrap bit for T0_TAIL_PTR is 0, and the T0_STALL_PTR is greater than the T0_TAIL_PTR then there is not enough room in the queue to allocate the require entries for thread 0. If there is not enough room to allocate the required entries or if T0_CLEAR is activated then the process proceeds to block 1447 to activate the stall signal for thread 0, T0_STALL (also referred to as ALstallT0). Otherwise the process proceeds to block 1443 to deactivate the stall signal for thread 0. The process then proceeds from either block 1443 or block 1447 to block 1451. At decision block 1451, if T0_STALL is not active then the process proceeds to block 1455 to allocate the required entries in the queue and update the T0_HEAD_PTR to reflect the allocation made. Otherwise the process proceeds to block 1459 to restore the previous value of the T0_STALL_PTR in preparation for the next round of resource computation and allocation for thread 0. The process then proceeds from either block 1455 or block 1459 to end at block 1491.

It should be noted that while the process is described in a sequential manner, many of the tasks performed by the process do not need to be done sequentially and can be done in parallel or in a different order provided that there is no logical dependencies between those tasks.

Figure 15:
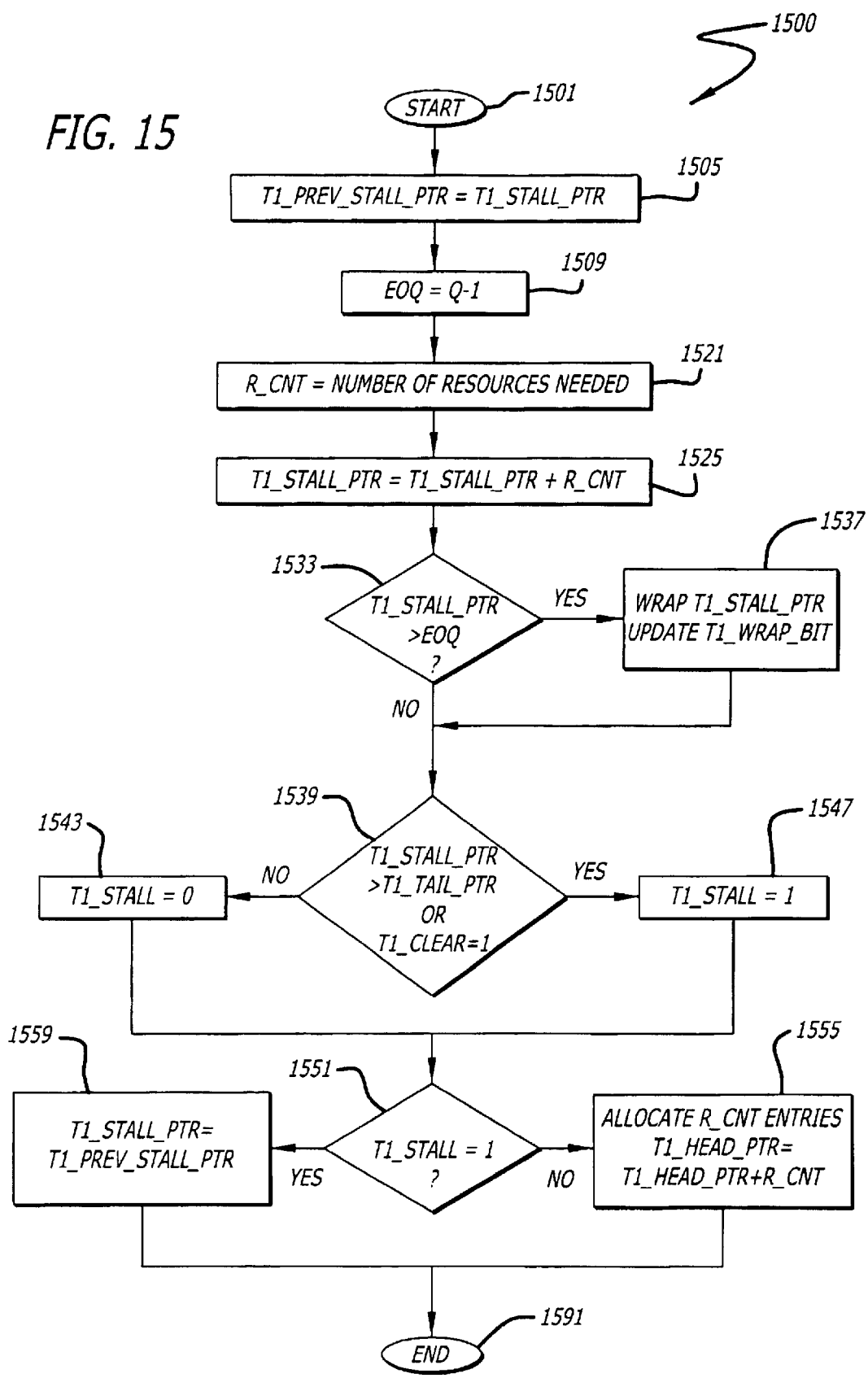
FIG. 15 is a detailed flow diagram for performing resource allocation for the other of the two threads.

FIG. 15 shows a flow diagram of one embodiment of the resource computation and resource allocation process for thread 1 according to the teachings of the present invention.

As explained above, after the CRNuke signal is asserted and the Nuke event is done with respect to thread 0 and thread 1, the associated pointers for each resource are initialized to the appropriate values depending on whether the processor is to run in ST mode or MT mode.

The process begins at block 1501 and proceeds to block 1505 to set the T1_PREV_STALL_PTR to be equal to the current T1_STALL_PTR. The process then proceeds to block 1509 to select Q−1 as the end of queue value for thread 1. The process then continues to block 1521 to compute the number of entries needed for this set of input UOPs. The process proceeds to block 1525 to compute the new value for the T1_STALL_PTR. In one embodiment, the T1_STALL_PTR is incremented by the number of entries computed in block 1521 to obtain the new value for T1_STALL_PTR. For example, T1_STALL_PTR=T1_STALL_PTR+R_CNT where R_CNT is the number of entries needed that is computed in block 1521. At decision block 1533, the process proceeds to block 1537, if T1_STALL_PTR advances past the corresponding EOQ. Otherwise the process continues to block 1539. Since the queue to be allocated here is configured as a circular queue, once the T1_STALL_PTR advances past the EOQ it needs to be wrapped around and its corresponding wrap bit needs to be toggled accordingly. For example, if the T1_STALL_PTR=EOQ then the T1_STALL_PTR is wrapped around to Q/2, which is the start of the corresponding portion of the queue reserved for thread 1. If the T1_STALL_PTR=EOQ+1, then the T1_STALL_PTR is wrapped around to Q/2+1, which is the start of the corresponding portion of the queue plus 1, and so on. The process then proceeds from block 1537 to block 1539. At block 1539, the T1_STALL_PTR is compared with T1_TAIL_PTR taken into consideration the values of their corresponding wrap bits to determine whether there are enough free entries in the queue to allocate the entries required. In one embodiment, if the wrap bit for T1_STALL_PTR is 1, the wrap bit for T1_TAIL_PTR is 0 and the T1_STALL_PTR is greater than the T1_TAIL_PTR then there is not enough room in the queue to allocate the require entries for thread 1. If there is not enough room in the queue to allocate the required entries or if the T1_CLEAR signal is activated, the process proceeds to block 1547 to activate the stall signal for thread 1, T1_STALL (also referred to as ALstallT1). Otherwise the process proceeds to block 1543 to deactivate the stall signal for thread 1. The process then proceeds from either block 1543 or block 1547 to block 1551. At decision block 1551, if T1_STALL is not active then the process proceeds to block 1555 to allocate the required entries in the queue and update the T1_HEAD_PTR to reflect the allocation made. Otherwise the process proceeds to block 1559 to restore the previous value of the T1_STALL_PTR in preparation for the next round of resource computation and allocation for thread 1. The process then proceeds from either block 1555 or block 1559 to end at block 1591.

It should be noted that while the process is described in a sequential manner, many of the tasks performed by the process do not need to be done sequentially and can be done in parallel or in a different order provided that there is no logical dependencies between those tasks.

Figure 16:
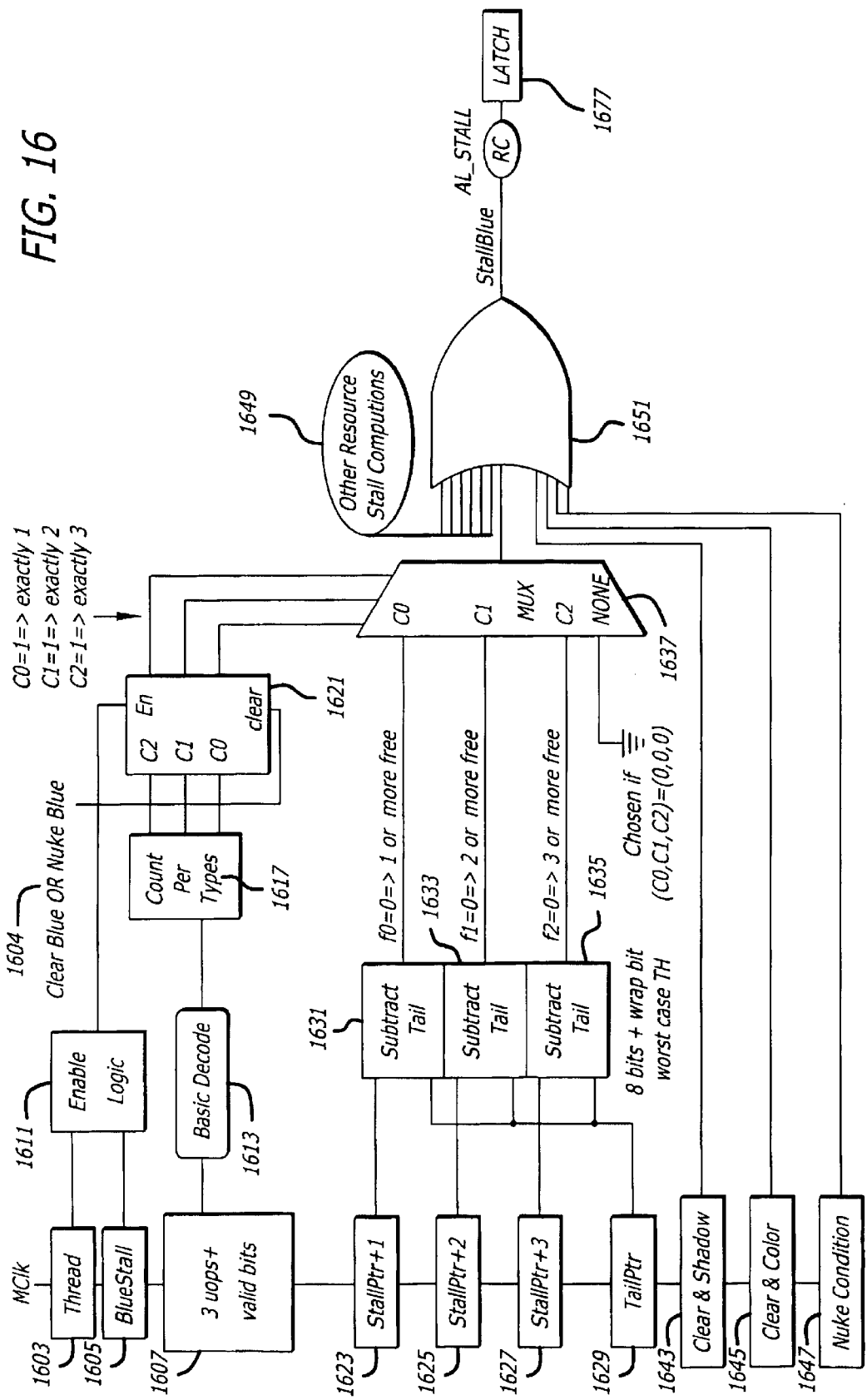
FIG. 16 is a block diagram of one embodiment of an apparatus for performing stall computation and generating a stall signal.

FIG. 16 shows a block diagram of one embodiment of an apparatus for performing the stall computation for thread 0 and thread 1. In this embodiment, the stall computation for both thread 0 and thread 1 are done in parallel in every clock cycle even though resource allocation is performed for one thread at a time. In the discussion that follows, thread 0 will also be referred to as the blue thread and thread 1 will also be referred to as the red thread. Accordingly, various operations or pointers associated with thread 0 will also be referred to as the "blue" operations or "blue" pointers, for example T0_STALL_PTR will also be referred to as the BLUESTALLPTR. Similarly, various operations or pointers associated with thread 1 will also be referred to as the "red" operations or "red" pointers, for example T1_STALL_PTR will also be referred to as the REDSTALLPTR. In addition, the discussion below will focus on the operations and computations with respect to thread 0 (the blue thread) although everything discussed herein equally applies to the other thread (thread 1 or the red thread).

In one embodiment, the stall computation unit shown in FIG. 16 can contain several logical blocks that operate together to perform the stall computation with respect to a particular thread, e.g., thread 0, and to activate the appropriate stall signal if certain conditions are satisfied. These logical blocks include: a first block that performs UOP decoding and counting to determine the number of entries required in a particular resource to execute the input UOPs; a second block that computes the available entries in the resource; a third block that contains stall conditions related to CRClear or CRNuke conditions that are driven from state machines; a fourth block that performs stall pointer computation that needs to be evaluated and used in the stall computation in the next clock. A detailed description of the fourth block is provided below with respect to FIG. 17. In this embodiment, as mentioned above, the stall computation for both thread 0 and thread 1 are done in parallel in every clock cycle even though resource allocation is performed for one thread at a time.

Referring again to FIG. 16, a set of three input UOPs and their corresponding valid bits 1607 are inputted into a basic decode logic 1613. The basic decode logic 1613 decodes the input UOPs and provides the decoded information to a counting logic 1617 that counts the number of entries required based upon the types of the input UOPs. The outputs from the counting logic 1617 are then latched by the latching device 1621 which provides the appropriate select signals to the selector 1637 based upon the number of entries required as determined by the counting logic 1617. As shown in FIG. 16, the three inputs C0, C1, and C2 of the latching device 1621 are set as follows by the counting logic 1617: C0 is set to 1 if there is exactly one entry required; C1 is set to 1 if there are exactly two entries required; and C2 is set to 1 if there are exactly three entries required.

Referring again to FIG. 16, the second block, also referred to as the resource availability block, computes the number of available entries in the resource as follows. Since the three input UOPs 1607 may require up to three entries in the resource for their execution, there are three different scenarios that need to be considered. The first scenario is that the number of entries required by the input UOPs is one and the resource has at least one free entry to allocate which is sufficient. The second scenario is that the number of entries required by the input UOPs is two and the resource has at least two free entries to allocate which is sufficient. The third scenario is that the number of entries required is three and the resource has at least three free entries to allocate which is sufficient. Accordingly, the subtract logic 1631, subtract logic 1633, and the subtract logic 1635 are performed in parallel to compare three different values of the stall pointer with the value of the tail pointer taken into consideration the values of the wrap bits associated with these two pointers to determine the resource availability with respect to the three scenarios described above. The values of the wrap bits need to be considered because the resource is structured as a circular queue in this example, as described above. The subtract logic 1631 compares the value of the current stall pointer plus one (StallPtr+1) with the value of the tail pointer 1629, taken into consideration the values of the corresponding wrap bits. The output of the subtract logic 1631 is set to low if there is at least one free entry in the resource to allocate. If there are no free entries in the resource, then the output of the subtract logic 1631 is set to high. Similarly, the output of the subtract logic 1633 is set to low if there are at least two free entries in the resource to allocate and is set to high otherwise. Likewise, the output of the subtract logic 1635 is set to low if there are at least three free entries in the resource to allocate and set to high otherwise. The outputs from the subtract logic 1631, subtract logic 1633, and the subtract logic 1635 are then inputted into the selector 1637. The selector 1637 selects either the output from subtract logic 1631, the output from the subtract logic 1633, or the output from the subtract logic 1635, depending on the select input signals from the latching device 1621. If the input UOPs require only one entry, then C0 is set to high which causes the selector 1637 to select the output from the subtract logic 1631. If the input UOPs require only two entries, then C1 is set to high which causes the selector 1637 to select the output from the subtract logic 1633. If the input UOPs require three entries, then C2 is set to high which causes the selector 1637 to select the output from the subtract logic 1635. If no entry is required by the input UOPs, then C0, C1, and C2 are all set to low which causes the selector 1637 to select a low value as its output. The selector 1637, based upon the select signals representing the number of entries required by the input UOPs and the signals representing the number of entries available in the resource, generates a corresponding signal indicating whether the resource has sufficient available entries. As an example, assuming that the input UOPs require only one entry. In this case, the counting logic 1617 will set the C0 input of the latching device 1621 which will cause the selector 1637 to select the output from the subtract logic 1631. In this case, there can be two possible outcomes depending on whether the resource has at least one free entry to allocate. As described above, if the resource has at least one free entry then the output of the subtract logic 1631 is set to low, otherwise it is set to high. If the output of the subtract logic 1631 is set to low, there is at least one free entry in the resource and that is sufficient because the input UOPs only require one entry in this example. If the output of the subtract logic 1631 is set to high, the resource is full and the required entry cannot be allocated in this example, which is a stall condition. As shown in FIG. 16, the output of the selector is inputted into the OR gate 1651. The output of the selector 1637 represents a stall condition due to insufficient resource. Accordingly, if the output of the selector 1637 is set to high, the stall signal for thread 0 will be activated.

As described above, the third block contains other stall conditions such as CRClear and CRNuke conditions. The signals representing CRClear conditions 1643, 1645, and the CRNuke condition 1647 are also inputted into the OR gate 1651. In addition, the signals representing resource stall computations with respect to other resources are also inputted into the OR gate 1651. Accordingly, the stall signal for thread 0 will be activated if any one of the input signals to the OR gate 1651 is set.

Figure 17:
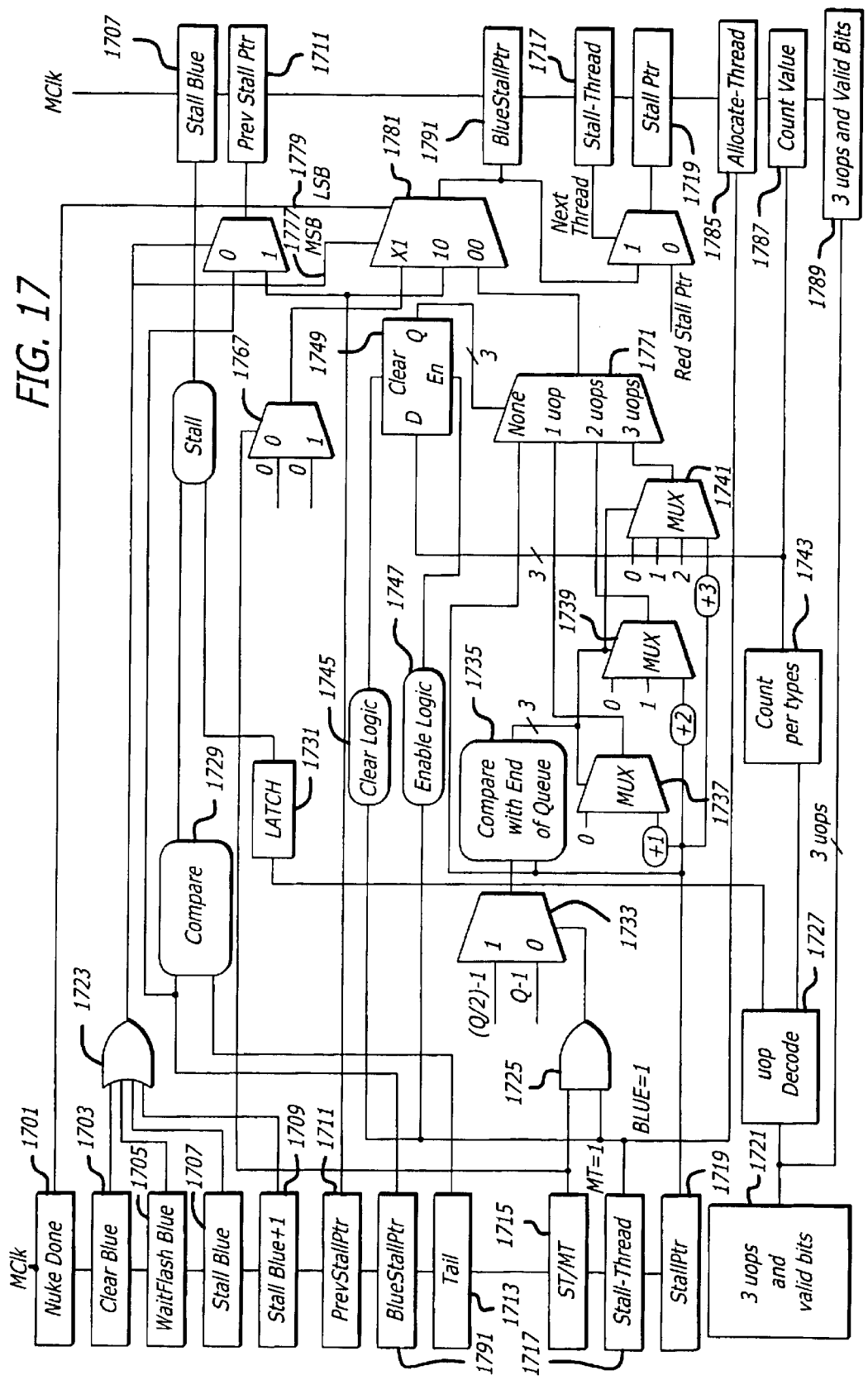
FIG. 17 is a block diagram of another embodiment of an apparatus for updating the value of a stall pointer.

FIG. 17 is a block diagram of one embodiment of an apparatus for updating the value of the stall pointer for thread 0 (the blue thread) based upon various conditions discussed below. Everything discussed herein is equally applicable to thread 1 (the red thread) stall pointer update functionality. In this embodiment, there are three stall pointers that are maintained for each queue: one stall pointer for thread 0 (the blue stall pointer), one stall pointer for thread 1 (the red stall pointer), and one stall pointer for the working thread. In one embodiment, it is assumed in every clock that the machine would not stall and so the next stall pointer to be used for the stall computation would be set as if the allocation were done successfully. If stall is in fact activated, the stall pointer will be restored back to its previous value to reflect that no allocation is made in the last clock.

As shown in FIG. 17, the new value of the stall pointer for thread 0 (also referred to as T0_STALL_PTR or BlueStallPtr) 1791 can be set or updated to different values by the selector 1781 based upon the select signals 1777 and 1779. Basically, the value of the BlueStaUlPtr is updated based on three different scenarios according to the values of the select signals 1777 and 1779. In the first scenario, the selector 1781 will select, as the BlueStallPtr 1791, the output of the selector 1767 if the second select signal 1779 is set. The select signal 1779 is set according to the Nuke Done signal 1701. In this case, when the Nuke Done signal 1701 is set, the BlueStallPtr 1791 is initialized to its appropriate starting value, which is zero in either ST mode or MT mode. As described above, thread 0 pointers and thread 1 pointers are initialized to point to their corresponding portions of the queue based upon whether the current processing mode is ST or MT. For example, if the current processing mode is ST, the end of queue with respect to thread 0 (the blue thread) will be set to Q−1 by the selector 1733. If the current processing mode is MT, the end of queue with respect to thread 0 (the blue thread) will be set to Q/2−1 by the selector 1733.

In the second scenario, the selector 1781 will select the value of the previous stall pointer for thread 0 (PrevStallPtr) 1711 as the value for the BlueStallPtr 1791 if the first select signal 1777 is set and the second select signal 1779 is not set. Therefore, in this scenario, the BlueStallPtr 1791 is restored back to its previous value if the Nuke Done signal is not set and any of the following stall conditions is present: Clear Blue, WaitFlash Blue, Stall Blue, Stall Blue+1, etc. All of these different stall conditions are input to the OR gate 1723 the output of which is used as the select signal 1777. As explained above, once it is determined that the stall signal is active, the stall pointer needs to be restored back to its previous stall value to reflect the fact that no allocation was made in the last clock.

In the third scenario, the selector 1781 will select the output of the selector 1771 as the new value for the BlueStallPtr 1791 if both select signals 1777 and 1779 are not set, i.e., if there is no nuke event and none of the stall conditions for thread 0 is present. In this case, if the blue thread is the current working thread, then the BlueStallPtr 1791 will be incremented by a value corresponding to the number of required entries to be allocated, assuming that the queue has sufficient available entries to allocate the number of entries required by the input UOPs. Since the queue in this example is circular, the BlueStallPtr may be wrapped around if it advances past the end of its corresponding portion in the queue. Since the input UOPs may require from 0 to 3 entries in the queue for their execution, the StallPtr 1719 which represents the current value of the BlueStallPtr 1791 may be advanced by 0, 1, 2, or 3. To enable fast computation for the new value of the BlueStallPtr 1791, the four possible different values of the StallPtr 1719 are computed separately and compared against the appropriate value of the blue thread end of queue (EOQ) in parallel to determine whether wrapping around is needed. The selector 1737 will select either 0 or StallPtr+1 depending on whether StaRPtr+1 is greater than the EOQ. If the StallPtr+1 is not greater than EOQ, then there is no wrap around. If the StallPtr+1 is greater than EOQ, then it is wrapped around to point to 0, the beginning of the queue. Similarly, the selector 1739 will select either 0, 1, or StallPtr+2 depending on whether StallPtr+2 is greater than the EOQ. If StallPtr+2 is not greater than the EOQ, then there is no wrap around. If StallPtr+2 goes past the EOQ by 1, then it is wrapped around to point to 0, the beginning of the queue. If the StallPtr+2 goes past the queue by 2, then it is wrapped around to point to 1. Likewise, the selector 1741 will select either 0, 1, 2, or StallPtr+3 depending on whether the StallPtr+3 is greater than the EOQ. The outputs of the selectors 1737, 1739, and 1741 are then inputted to the selector 1771. The selector 1771 will select either the unchanged value of the StallPtr, the output of the selector 1737, the output of the selector 1739, or the output of the selector 1741, based upon the select signal provided by the latching device 1749. Accordingly, if the input UOPs 1721 require no entry in the queue, then the current value (unchanged) of the StallPtr 1719 will be selected as the new value for the BlueStallPtr 1791. If the input UOPs require 1 entry, then either StallPtr+1 or its corresponding wrapped around value will be selected as the new value for BlueStallPtr 1791. If the input UOPs require 2 entries, then either StallPtr+2 or its corresponding wrapped around value will be selected as the new value for the BlueStallPtr 1791. Finally, if the input UOPs require 3 entries, then either StallPtr+3 or its corresponding wrapped around value will be selected as the new value for the BlueStallPtr 1791.

In summary, the new value for the BlueStallPtr 1791 is updated as follows for the three different scenarios described above:

Scenario 1: When NUKE DONE signal is asserted indicating that the Nuke event is done.

BlueStallPtr=0

Scenario 2: When NUKE DONE is not asserted and at least one stall condition (e.g., stall due to insufficient resource, stall due to CRClear, etc.) is present with respect to the blue thread.

BlueStallPtr=PrevStallPtr

Scenario 3: When NUKE DONE is not asserted and there is no stall condition present with respect to the blue thread.

If StallPtr+R_CNT is not greater than the EOQ for the blue thread then

BlueStallPtr=StallPtr+R_CNT else

BlueStallPtr=Wrap-Around(StallPtr+R_CNT)

where R_CNT is the number of entries required by the input UOPs.

Figure 18:
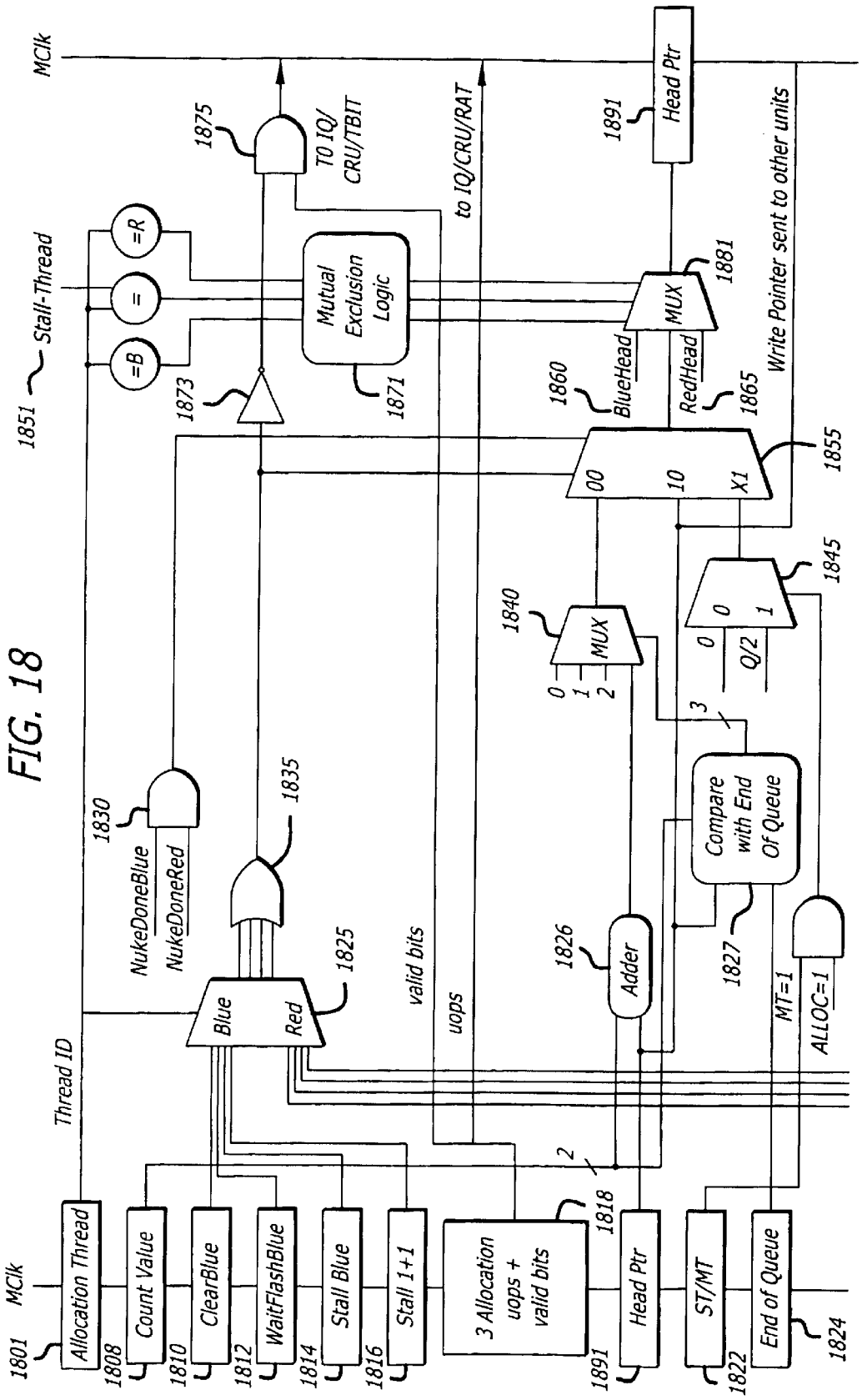
FIG. 18 is a block diagram of one embodiment of an apparatus for updating an allocation pointer.

FIG. 18 shows a block diagram of one embodiment of an apparatus for updating the allocation pointer used to allocate the required entries for the working thread. In one embodiment, as described above, only one thread can allocate in any given clock cycle even though stall computations are performed for both threads in every clock cycle. Therefore, the head pointers associated with a particular thread can be advanced or updated only in the clock cycle in which resource allocation is performed for that particular thread. The head pointers for a particular thread, for example thread 0, will not be advanced in the clock cycle in which either CRClear signal or any other stall condition is asserted with respect to that particular thread to reflect that no allocation is made in that clock cycle. On CRNuke, after the state in the RAT 301 has been recovered for both threads and all marbles for both threads have been freed, the head pointers will be updated to point back to the appropriate locations in the queue based on the processing mode after CRNuke is done. If the new processing mode or new configuration is ST, then either the head pointers for thread 0 or the head pointers for thread 1 will be updated to point to the beginning of the queues, depending on whether thread 0 or thread 1 is the working thread in the ST mode. If the new processing mode is MT, then the head pointers for both threads 0 and 1 will be updated. In this case, the head pointers for thread 0 will be updated to point to the beginning of the queues whereas the head pointers for thread 1 will be updated to point to the middle of the queues.

In one embodiment, there are three head pointers associated with each resource or queue: one head pointer for thread 0 (also referred to as T0_HEAD_PTR or BlueHead), one head pointer for thread 1 (also referred to as T1_HEAD_PTR or Redhead), and one head pointer to be used for the current working thread (referred to as HEAD_PTR or Head Ptr). In one embodiment, a thread bit indicating the current working thread will be used in addition to the working head pointer to select the appropriate entries in the queue to be allocated for the input UOPs.

Referring to FIG. 18, the new value for the Head Ptr 1891 can be set or updated to different values based on different scenarios according to the current allocation thread ID 1801 and the current stall thread ID 1851. The current allocation thread ID 1801 is used to indicate the particular thread being allocated in the current clock cycle, i.e., the working thread. The current stall thread ID 1851 is used to indicate the particular thread that will be allocated in the next clock cycle since stall computation is computed ahead of the allocation. The allocation thread ID 1801 and the stall thread ID 1851 are inputted to a mutual exclusion logic 1871 which generates the appropriate select signals for the selector 1881 according to the values of the allocation thread ID 1801 and the stall thread ID 1851. If both the allocation thread ID 1801 and the stall thread ID 1851 have the same values (e.g., both indicate blue or both indicate red), then the selector 1881 will select the output of the selector 1855 as the new value for the Head Ptr 1891. If the allocation thread ID 1801 is red and the stall thread ID 1851 is blue, then the value of the head pointer for the blue thread (i.e., the BlueHead) 1860 will be selected as the new Head Ptr 1891. If the allocation thread ID is blue and the stall thread ID is red, then the value of the head pointer for the red thread (i.e., the RedHead) 1865 will be selected as the new Head Ptr 1891. The selector 1855 selects, as its output, either the output of the selector 1840, the output of the selector 1845, or the current value of the Head Ptr 1891, based on the select signals that are generated by the AND gate 1830 and the OR gate 1835. The two inputs to the AND gate 1830 are the two signals indicating that Nuke is done for the blue thread and Nuke is done for the red thread. Thus, the output of the AND gate is only set if both of these signals are asserted, i.e., nuke is done for both threads. There are four inputs to the OR gate 1835. Accordingly, the output of the OR gate 1835 is set if any of its four inputs is set. The four inputs to the OR gate 1835 represent the different stall conditions for either the blue thread or the red thread which are selected accordingly by the selector 1825 based on the allocation thread ID 1801.

Referring again to the selector 1855, there are three different scenarios that can occur based on the select signals from the AND gate 1830 and the OR gate 1835. In the first scenario, if the output of the AND gate 1830 is set then the output of the selector 1845 is selected as the output of the selector 1855. In this case, the new value for the Head Ptr 1891 will be initialized to 0 or Q/2 depending on the current processing mode as indicated by the ST/MT signal 1822 and the allocation thread. In the second scenario, if the output of the AND gate 1830 is not set and the output of the OR gate 1835 is set, then the value of the Head Ptr 1891 is not updated. This is the case where the allocating thread is being stalled and therefore no allocation is made. Accordingly, the Head Ptr is not updated to reflect the fact that no allocation is made in the current clock cycle due to a stall condition.

In the third scenario, if both the outputs of the AND gate 1830 and the OR gate 1835 are not set, then the output of the selector 1840 will be selected as the new value for the Head Ptr 1891. This is the case where there is no nuke event and there is no stall condition present and therefore the current Head Ptr 1891 needs to be advanced by a corresponding value to reflect the number of entries allocated in this clock cycle. Since the queue in this example is circular, if the value of the Head Ptr 1891 plus the count value 1808 is greater than the end of queue then it will be wrapped around. The selector 1840 will select as its output either the output of the adder 1826 or its corresponding wrap around value based on the result of the comparison generated by the compare logic 1827. The output of the selector 1840 will then be selected as the new value for the Head Ptr 1891.

The invention has been described in conjunction with the preferred embodiment. It is evident that numerous alternatives, modifications, variations and uses will be appreciated by those skilled in the art in fight of the foregoing description.

What is claimed is:

1. A processor comprising:
   an instruction delivery engine to store and fetch instructions to be executed by the processor from a plurality of threads based upon a current processing mode; and
   an allocator to receive instructions from the instruction delivery engine and to perform allocation in a processor resource required for the execution of the instructions based upon the current processing mode, wherein the allocator,
      if the current processing mode is single threading,
         assigns all of the processor resource to one of the plurality of threads that is active, allocates an amount of entries for the instructions from the one of the plurality of threads in the processor resource if the processor resource has sufficient available entries, and
         activates at least one stall signal if the processor resource does not have sufficient available entries; and,
      if the current processing mode is multithreading,
         assigns a portion of the processor resource, to each of the plurality of threads running concurrently,
         allocates an amount of entries for the instructions from each respective thread in a respective portion of the processor resource if the respective portion has sufficient available entries, and
         activates at least one stall signal if the respective portion does not have sufficient available entries.

2. The processor of claim 1 wherein the instruction delivery engine uses the at least one stall signal to perform its corresponding function.

3. The processor of claim 2 wherein the instruction delivery engine re-fetches stalled instructions in the respective thread to the allocator if the at least one stall signal is activated.

4. The processor of claim 2 wherein the instruction delivery engine fetches a subsequent instruction from another thread to the allocator if the at least one stall signal for the respective thread is activated and said another thread is not stalled.

5. The processor of claim 2 wherein the instruction delivery engine fetches an invalid instruction to the allocator if the stall signal for the respective thread is activated.

6. A method for allocating processor resources by a processor, the method comprising:
   fetching instructions to be executed by the processor from one or more threads based upon a current Processing mode; and,
   performing allocation in a processor resource required for the execution of the instructions based upon the current processing mode, wherein performing allocation includes,
      if the current processing mode is single threading,
         assigning all of the processor resource to one of the plurality of threads that is active,
         allocating an amount of entries for the instructions from the one of the plurality of threads in the processor resource if the processor resource has sufficient available entries, and
         activating at least one stall signal if the processor resource does not have sufficient available entries; and,
      if the current processing mode is multithreading,
         assigning a portion of the processor resource to each of the plurality of threads running concurrently,
         allocating an amount of entries for the instructions from each respective thread in a respective portion of the processor resource if the respective portion has sufficient available entries, and
         activating at least one stall signal if the respective portion does not have sufficient available entries.

7. The method of claim 6 further comprising using the at least one stall signal to perform corresponding functions by the instruction delivery engine.

8. The method of claim 7 further comprising re-fetching stalled instructions in the respective thread to the allocator if the at least one stall signal is activated.

9. The method of claim 7 further comprising fetching a subsequent instruction from another thread to the allocator if the at least one stall signal for the respective thread is activated and said another thread is not stalled.

10. The method of claim 7 further comprising fetching an invalid instruction to the allocator if the stall signal for the respective thread is activated.

11. A processor comprising:
    means for fetching instructions to be executed by the processor from one or more threads based upon a current processing mode;

means for performing allocation in a processor resource required for the execution of the instructions based upon the current processing mode;

means that are operative if the current processing mode is single threading for assigning all of the processor resource to one of the plurality of threads that is active, allocating an amount of entries for the instructions from the one of the plurality of threads in the processor resource if the processor resource has sufficient available entries, and activating at least one stall signal if the processor resource does not have sufficient available entries; and, means that are operative if the current processing mode is multithreading for assigning a portion of the processor resource to each of the plurality of threads running concurrently, allocating an amount of entries for the instructions from each respective thread in a respective portion of the processor resource if the respective portion has sufficient available entries, and activating at least one stall signal if the respective portion does not have sufficient available entries.

12. The processor of claim 11 further comprising means for using the at least one stall signal to perform corresponding functions by the instruction delivery engine.

13. The processor of claim 12 further comprising means for re-fetching stalled instructions in the respective thread to the allocator if the at least one stall signal is activated.

14. The processor of claim 12 further comprising means for fetching a subsequent instruction from another thread to the allocator if the at least one stall signal for the respective thread is activated and said another thread is not stalled.

15. The processor of claim 12 further comprising means for fetching an invalid instruction to the allocator if the stall signal for the respective thread is activated.

* * * * *

UNITED STATES PATENT AND TRADEMARK OFFICE
CERTIFICATE OF CORRECTION

PATENT NO.        : 7,051,329 B1
APPLICATION NO.   : 09/473575
DATED             : May 23, 2006
INVENTOR(S)       : Boggs et al.

It is certified that error appears in the above-identified patent and that said Letters Patent is hereby corrected as shown below:

In column 8, at line 48, after "327," delete ".".

In column 9, at line 17, delete "AU" insert --All--.

In column 10, at line 50, delete "TO_READ_PTR," insert --TO_HEAD _PTR, --.

In column 22, at line 43, delete "BlueStaUlPtr" insert --BlueStallPtr--.

In column 23, at line 26, delete "StaRPtr+1" insert --StallPtr+1--.

In column 25, at line 46, after second occurrence "in" delete "fight" insert --light--.

In column 26, at line 2, after "resource" delete ",".

In column 26, at line 27, after "current" delete "Processing" insert --processing--.

Signed and Sealed this

Seventeenth Day of April, 2007

JON W. DUDAS
*Director of the United States Patent and Trademark Office*